United States Patent [19]

Kaino et al.

[11] 4,381,269

[45] Apr. 26, 1983

[54] FABRICATION OF A LOW-LOSS PLASTIC OPTICAL FIBER

[75] Inventors: Toshikuni Kaino; Michiya Fujiki; Shigeo Nara, all of Mito; Shigeru Oikawa, Katsuta, all of Japan

[73] Assignee: Nippon Telegraph & Telephone Public Corporation, Japan

[21] Appl. No.: 316,834

[22] Filed: Oct. 30, 1981

[30] Foreign Application Priority Data

Nov. 11, 1980 [JP] Japan .................................. 55-157599
Nov. 14, 1980 [JP] Japan .................................. 55-159599

[51] Int. Cl.³ .......................... B29D 11/00; G02B 5/14
[52] U.S. Cl. ................................ 264/1.5; 350/96.30;
350/96.34; 428/361; 428/373; 526/329.7
[58] Field of Search ....................... 264/1.5; 526/329.7;
428/361, 373; 350/96.29, 96.30, 96.34

[56] References Cited

U.S. PATENT DOCUMENTS

| | | | |
|---|---|---|---|
| 3,930,103 | 12/1975 | Chimura et al. | 428/361 |
| 3,993,834 | 11/1976 | Chimura et al. | 428/373 |
| 4,161,500 | 7/1979 | Schleinitz | 264/1.5 |

FOREIGN PATENT DOCUMENTS

| | | | |
|---|---|---|---|
| 2455265 | 6/1975 | Fed. Rep. of Germany ... | 350/96.34 |
| 54-80758 | 6/1979 | Japan . | |
| 55-103504 | 8/1980 | Japan .................................. | 264/1.5 |
| 56-8321 | 2/1981 | Japan . | |
| 56-8322 | 2/1981 | Japan . | |
| 56-8323 | 2/1981 | Japan . | |
| 1037498 | 7/1966 | United Kingdom . | |

Primary Examiner—James B. Lowe
Attorney, Agent, or Firm—Parkhurst & Oliff

[57] ABSTRACT

In a sealed system, a polymerization initiator and a chain transfer agent are added to a methyl methacrylate monomer distilled under reduced pressure condition via a distillation step of the former both ingredients, the methyl methacrylate monomer is successively polymerized to prepare a core polymer while maintaining the reduced pressure condition, then the resulting core polymer is subjected to melt spinning to form a core fiber while maintaining the sealed system, and a clad of a macromolecular compound having a refractive index lower than that of the aforesaid core fiber is adhered around the periphery thereof, whereby a low-loss plastic optical fiber with excellent optical transmission characteristics having a core-cladding structure is fabricated. Plastic optical fibers so made exhibit light attenuation as low as 60 dB/km or lower.

22 Claims, 12 Drawing Figures

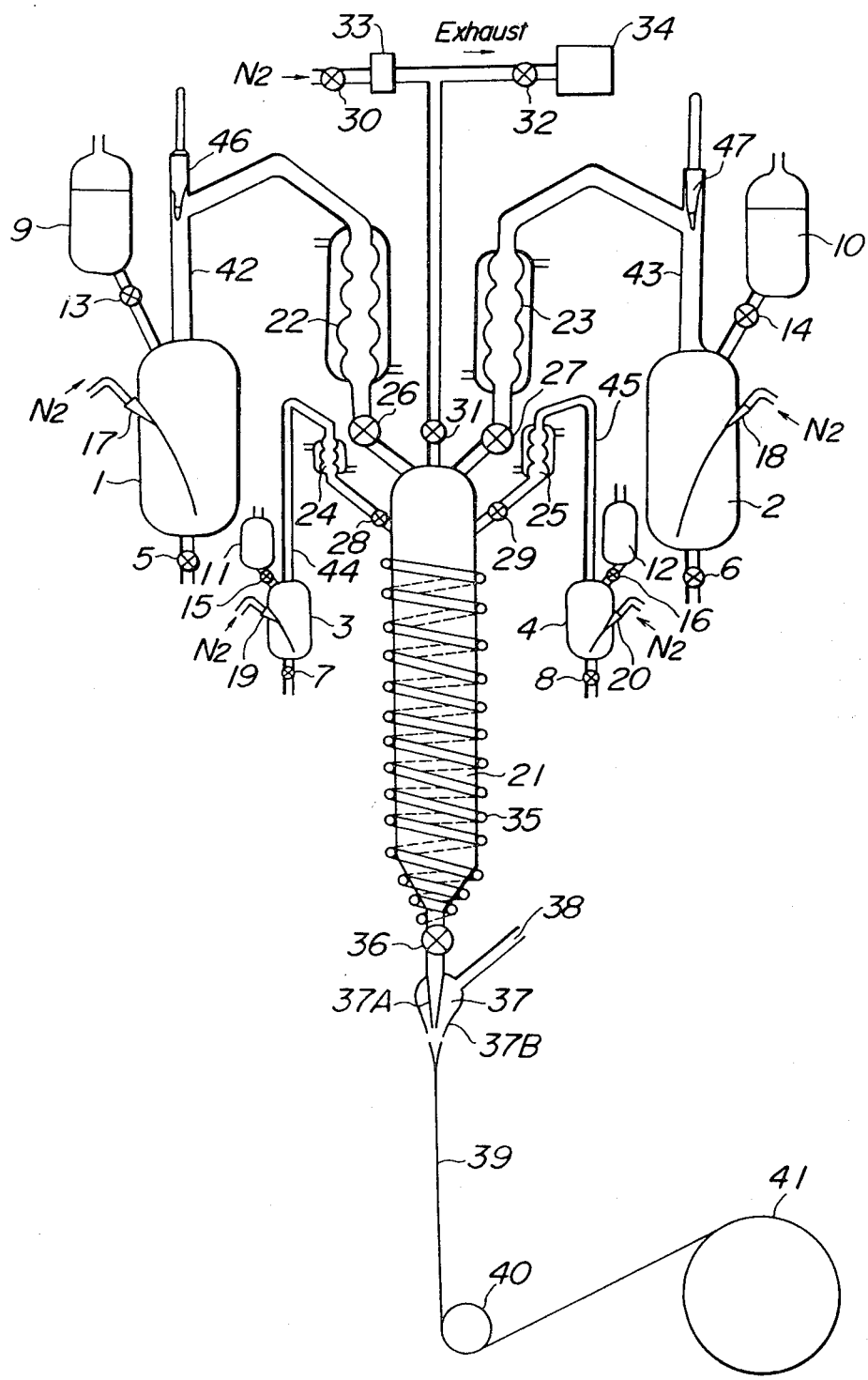

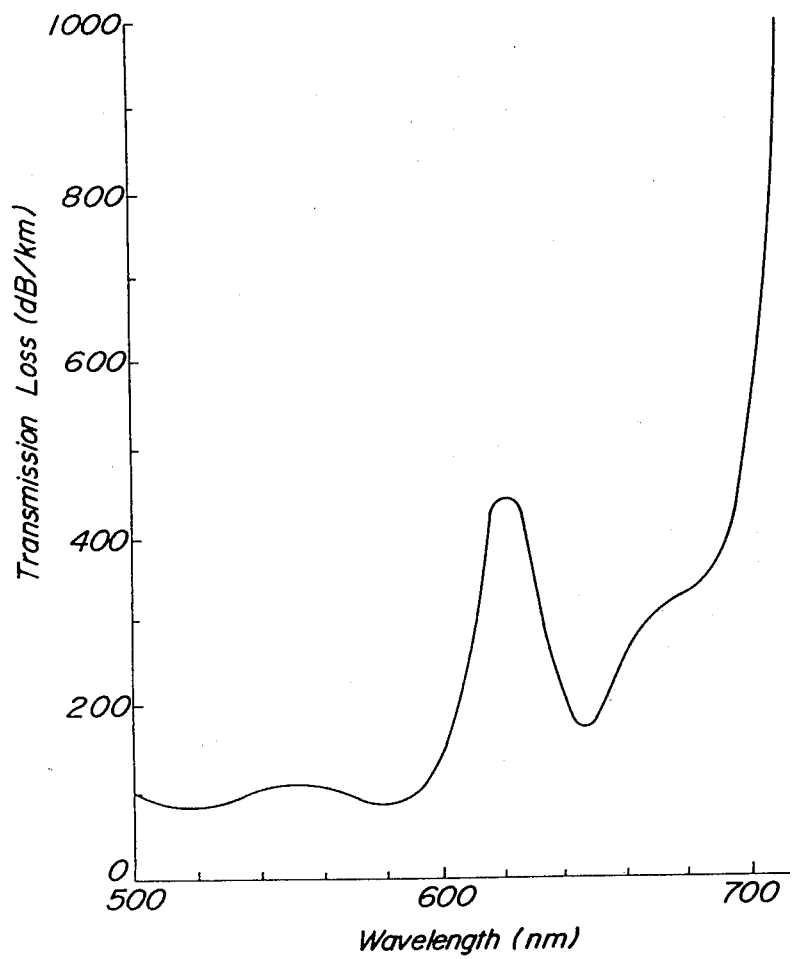
FIG_3

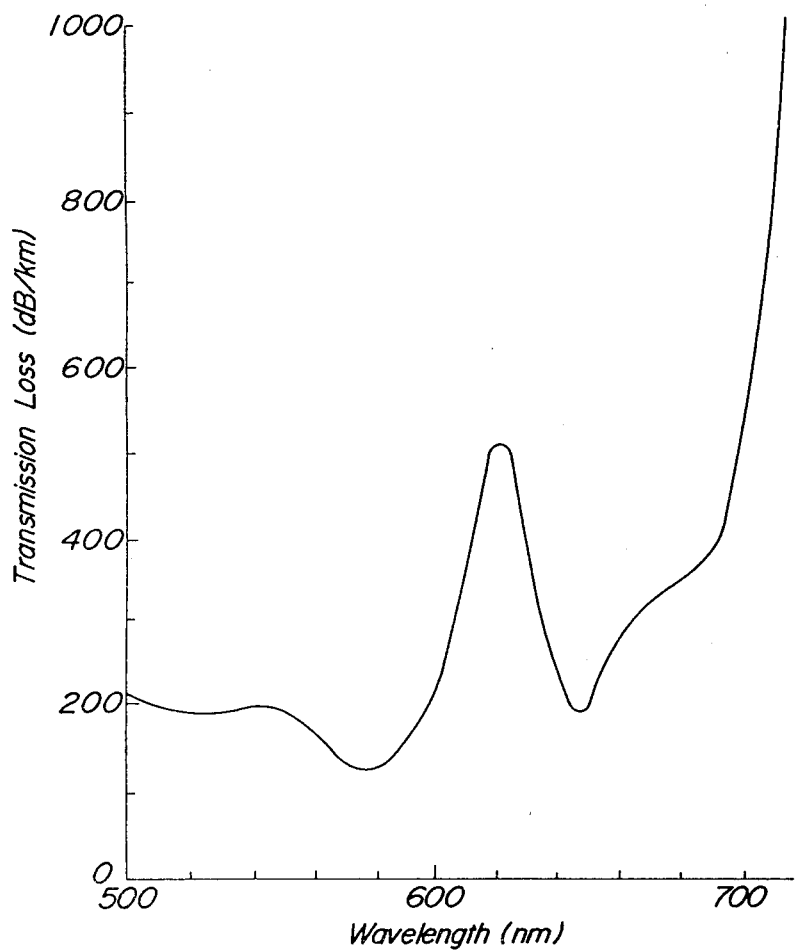
FIG_4

FIG_5
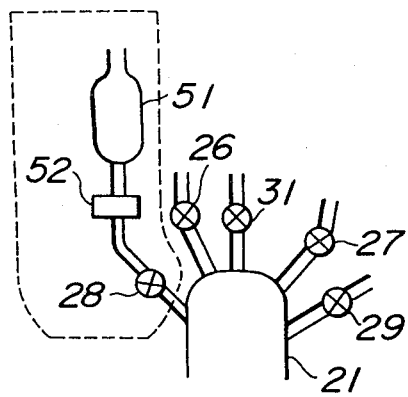
FIG_7
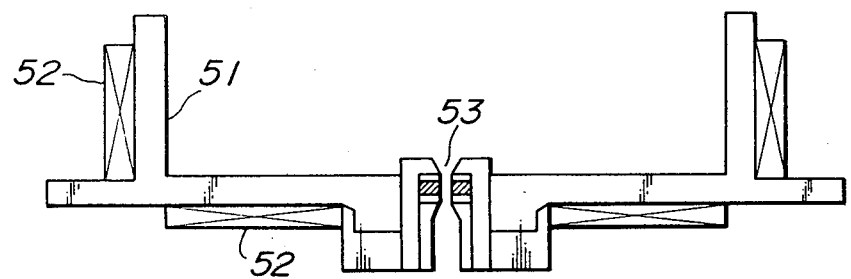
FIG_8
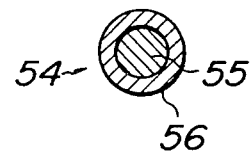

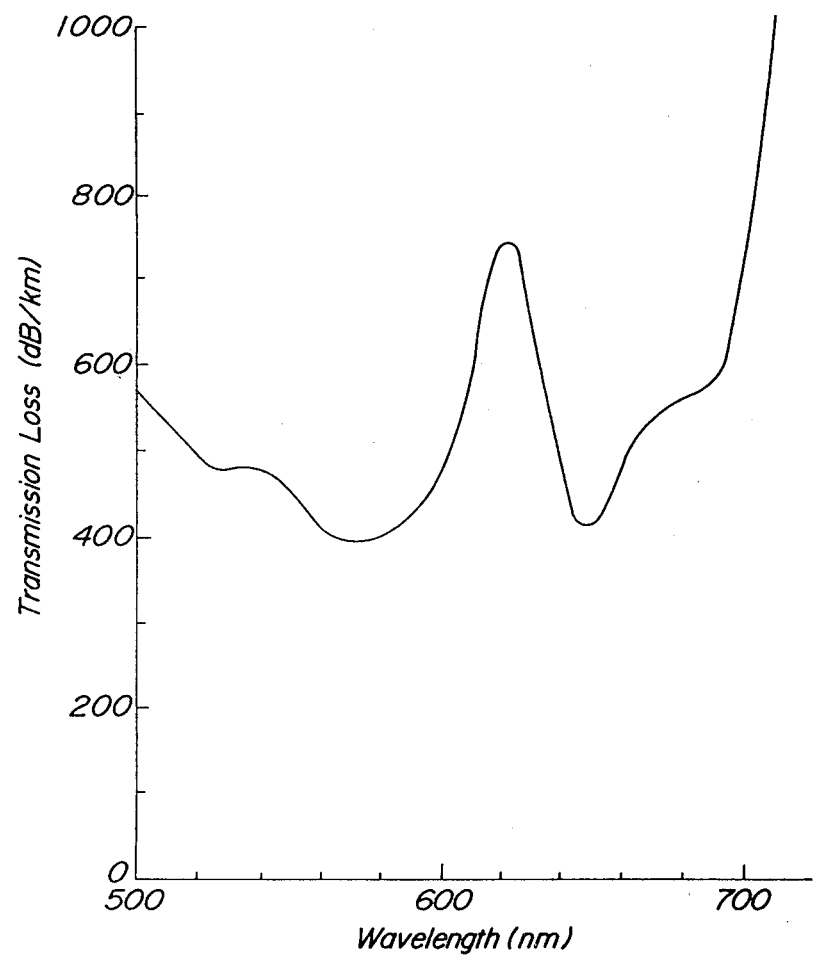
FIG_6

FIG_10

FABRICATION OF A LOW-LOSS PLASTIC OPTICAL FIBER

BACKGROUND OF THE INVENTION

The present invention relates to a fabrication method of low-loss plastic optical fibers consisting of a core of a polymer which is prepared from methyl methacrylate as the principal component and a cladding of a synthetic macromolecular compound having a lower refractive index than that of the core.

Heretofore, it has been well known to fabricate a plastic optical fiber having a concentric core-cladding structure consisting of a core component made of a synthetic macromolecular compound with excellent transparency represented by polystyrene or polymethyl methacrylate and a cladding component made of another synthetic macromolecular compound having a lower refractive index than that of the core component. And it has also been well known that the incident light introduced from one end of such optical fiber as set forth above is totally reflected inside the fiber along the longitudinal direction thereof to effect the transmission of the light. The matter to be taken into consideration in view of fabricating such kind of plastic optical fiber is that such a factor for increasing attenuation of light due to the absorption or scattering of the light in case of transmitting such light through the interior of the fiber should be minimized. A so-called plastic optical fiber made of synthetic macromolecular compounds has such advantages as a lighter weight and superior flexibility, besides being easy to increase the numerical aperture than those of an optical fiber fabricated from an inorganic glass which has heretofore been known. On the contrary, such plastic optical fibers have a disadvantage that the degree of attenuation of light transmitting through the interior of the fiber is remarkable than that of a conventional inorganic glass optical fiber. In this respect, the present invention directs to reduction of the degree of attenuation of light in a plastic optical fiber produced from macromolecular compounds.

Such plastic optical fiber consists of a polymer for the core part and another polymer, having a lower refractive index than that of the former polymer, for the cladding part. In a conventional fabrication of plastic optical fibers, a clear polymer such as polystyrene, polymethyl methacrylate or the like has been employed as the core material, whilst another polymer having a lower refractive index than that of the clear polymer, more specifically, polymethyl methacrylate or the like in case where polystyrene is adopted as the core material, and fluorine polymer in case where polymethyl methacrylate is adopted as the core material has been utilized. The fabrication of a plastic optical fiber is carried out by double extrusion molding in which a cladding is applied around the outer periphery of a core fiber so as to form a covering layer for the core fiber simultaneously with the formation of the core fiber from the core material (such process being hereinafter referred to as "double spinning process"), or in accordance with a coating process in which a core fiber which has previously been formed is coated with a cladding to cover the outer periphery of the core fiber.

A plastic optical fiber has a larger diameter, large numerical aperture, and very superior flexibility than those of such optical fiber in which inorganic glass is utilized as the core material, and accordingly, the plastic optical fiber has such advantage that coupling efficiency with respect to the light source is significantly elevated, so that joining between fibers becomes very easy, but such a disadvantage that there is a larger transmission loss, on the contrary.

The transmission loss of a plastic optical fiber being now available on the market is about 300 dB/km, even if the most favorable wavelength band is selected (at wavelength of 570 nm or 650 nm), thus it is desired to lower transmission loss of such plastic optical fiber. Under these circumstances, the present inventors have variously studied upon a series of steps from the preparation of a core and clad materials to the formation of the core fiber in a conventional fabrication method in order to fix a cause for accompanying such a high transmission loss in a conventional plastic optical fiber, and as a result the following knowledge has been obtained.

Namely, in a conventional fabrication method of a plastic optical fiber, the core and cladding materials are generally synthesized in accordance with suspension polymerization method, and the so synthesized polymers are supplied to a device for fabricating such plastic optical fiber. It is generally recognized that suspension polymerization method is a method by which a polymer with a high purity can be obtained as an industrial method for synthesizing a macromolecular compound, but there is such a disadvantage in that since suspension polymerization method requires a large amount of water, the resulting polymer is easily contaminated with optical foreign materials contained in such water. Furthermore, there is also such disadvantage that a possibility of the contamination of the polymer by optical foreign materials is very remarkable in the course of the dehydration step thereof.

In addition, a pelletizing or preforming step for the resulting polymer is required for forming or melt-spinning the polymer. Besides there is also such a fear that the polymer is contaminated by optical foreign materials in the course of the pelletizing step for the polymer or a feeding step of such pelletized polymer to a fiber fabrication apparatus, or that the polymer is oxidized by air, because a polymer preparation apparatus is separately located from the fiber fabrication apparatus in most cases. Therefore, it is considered that the disadvantage of a high transmission loss in a conventional plastic optical fiber as mentioned above can be dissolved, if such obstacles are removed.

As a method for improving optical transmission characteristics of plastic optical fibers, a fabrication method in which the biacetyl content in methyl methacrylate is reduced, transition metallic ions are decreased, and further other particulate matters are removed by the filtration thereof, whereby an improved plastic optical fiber is obtained (see U.S. Pat. No. 4,161,500 and Japanese Laid-open Patent Application No. 65,555/1979 corresponding thereto), or fabrication method in which a core component is subjected to bulk polymerization, and then the separation of volatile materials containing a residual unreacted monomer as the principal constituent in the polymer is successively carried out, thereby to prepare an improved plastic optical fiber (see Japanese Laid-open Patent Application Nos. 83,046/1975 and 83,047/1975 as well as U.S. Pat. No. 3,993,834 corresponding thereto) has been proposed.

In connection with these methods, it is disclosed in U.S. Pat. No. 4,161,500 that attenuation of light accompanied with the existence of particulate materials can be improved on the basis of such fact that vinyl monomer contains substantially no particulate materials, i.e., preferably such vinyl monomer merely contains 100/mm³ or less particulate materials. According to the present inventors' knowledge, however, even if around 10/mm³ of particulate materials exist in such monomer, attenuation of light is significant, so that even the existence of 2/mm³ of particulate materials in the monomer is not sufficient in order to obtain a low-loss plastic optical fiber. Namely, the existence of 100/mm³ of particulate materials means the existence of around 20,000 particulate materials per 1 m fiber length in case, for example, of a plastic optical fiber having 0.5 mm diameter. As a consequence, if 1 particulate materials brings about loss of around 1/1,000 dB/m, it becomes loss of 20 dB/m in 1 m length fiber. As described above, it was confirmed that the existence of around 10/mm³ particulate materials caused a significant optical transmission loss, so that even the existence of 2/mm³ particulate materials in a monomer was not sufficient in order to fabricate a low-loss plastic optical fiber.

In the method according to U.S. Pat. No. 4,161,500 in which monomers are polymerized in a sealed system, the removal of dust or impurities etc. incorporated at the time of addition of a polymerization initiator and chain transfer agent to the monomers is attempted by the use of a filter having around 0.2–1 μm opening diameter in the following step, but such particulate materials still considerably remain in the monomers, and around 2/mm³ particulate materials clearly exist therein in spite of such expression that substantially no particulate materials contains. Furthermore, contamination of a granular article by dust or the like cannot be avoided in also the case where a ramextrusion material is polymerized in a sealed system, and then the resulting granular article is taken out and transferred to a spinning device. For this reason, attenuation amount of the plastic optical fiber fabricated in accordance with this method is merely a value of around 300 dB/km (at wavelength of 656 nm).

Moreover, in U.S. Pat. No. 4,161,500 which states that impurities, particularly, impurity ions such as transition metallic ions or the like in the polymer should be 500 ppb or less, preferably 100 ppb or less, if there exists 10 ppb of cobalt ion, a considerable increase of loss such as 50 dB/km causes at wavelength of 630 nm, or if 100 ppb of nickel ion exists, there causes more significant increase of loss such as 33 dB/km at wavelength of 850 nm.

Further, in also a continuous bulk polymerization process (see Japanese Laid-open Patent Application Nos. 83,046/1975 and 83,047/1975, or U.S. Pat. No. 3,993,834), the methods for the purification of a monomer as well as the addition of a polymerization initiator and chain transfer agent (molecular weight modifier) into the monomer are not suitable, so that contamination of the monomer by dust or impurities cannot be avoided. Although such process can decrease scattering loss due to particulate matters or absorption loss due to impurities up to a certain extent, the minimum value of attenuation amount is only a value of around 300 dB/km (at wavelength of 656 nm).

On one hand, as to a cladding component polymer, since the light transmitting through a core fiber is transmitted while being totally reflected on the core-cladding boundary surface, if the light is absorbed or scattered by the cladding component in the aforesaid boundary surface, permeability of the optical fiber is remarkably reduced. Especially, if the cladding component has crystallizability and opacity, scattering of the light is remarkable and in addition, even in case of such cladding component in which micro voids generates in the boundary surface, scattering of the light is outstanding. As clad component polymers, a copolymer of vinylidene fluoride and tetrafluoroethylene (see U.S. Pat. No. 3,930,103 or Japanese Patent Application Publication No. 21,660/1978 corresponding thereto) or fluoroalkyl methacrylate polymer (see U.K. Patent No. 1,037,498 or Japanese Patent Application Publication No. 8,978/1968 corresponding thereto) etc. has conventionally been known. In this case, since some crystallizability remains in the copolymer of vinylidene fluoride and tetrafluoroethylene, it results in lowering of optical permeability due to scattering of light in the core-cladding boundary surface. On the other hand, though fluoroalkyl methacrylate polymer is non-crystalline, the polymer has such disadvantages in that the fluoroalkyl methacrylate polymer containing fluoroalkyl groups having a sufficient adhesion to a core fiber has a low softening point, and that the fluoroalkyl methacrylate polymer containing fluoroalkyl groups having a relatively high softening point exhibits not necessarily excellent adherence to the core fiber. Besides, there is such a problem in that voids remain in the core-cladding boundary surface, because the polymerization condition for such fluoroalkyl methacrylate is not suitable. In case where there is an inferior adhesion of a cladding polymer to the core fiber, or remaining of voids in the core-cladding boundary surface, scattering of light in the boundary surface increases, whilst the optical permeability remarkably decreases.

In order to improve these disadvantages, such a method in which an unsaturated polymerizable compound is copolymerized as the third component with the copolymer of vinylidene fluoride and tetrafluoroethylene within a certain range, whereby the low crystallizability, transparency, adhesion to the core component and the like of the vinylidene fluoride-tetrafluoroethylene copolymer are improved has been proposed (Japanese Laid-open Patent Application No. 80,758/1979). Further, a method in which the structure of the fluoroalkyl group in fluoroalkyl methacrylate polymer is modified to improve the softening point of the polymer has been proposed (see Japanese Patent Application Publication Nos. 8,321/1981, 8,332/1981 and 8,323/1981). Among these methods, a method in which the ternary copolymer is employed (Japanese Laid-open Patent Application No. 80,758/1979) has such a problem in that crystallizability still remains, so that a clear polymer cannot be obtained, and a method in which the structure of fluoroalkyl group is modified (see Japanese Patent Application Publication Nos. 8,321/1981, 8,322/1981 and 8,323/1981) also accompanies such a problem in that such fluoroalkyl methacrylate polymer having a high softening point together with an excellent adhesion cannot be yet obtained. For these reasons as described above, plastic optical fibers fabricated in accordance with the aforesaid methods merely exhibit a value of around 78% white transmittance per 50 cm of an optical fiber in respect of optical transmission characteristics.

SUMMARY OF THE INVENTION

It is an object of the present invention to provide a fabrication method of a low-loss plastic optical fiber having a core-cladding structure exhibiting very excellent optical transmission characteristics in visible light region.

According to the present inventors' study, it became clear that a factor for optical transmission loss of plastic optical fibers was derived from light scattering accompanied with the influence of impurities, dust or micro voids contained in a synthetic macromolecular weight compound.

Therefore, another object of the present invention is to provide a fabrication method of a low optical transmission loss plastic optical fiber in which contamination of a monomer or polymer with impurities or dust is suppressed from a step for charging starting materials to a step of spinning the core fiber on the basis of the aforesaid present inventors' study.

In a fabrication of plastic optical fibers by using a polymer prepared from methyl methacrylate as the principal constituent for a core, and forming a cladding of a synthetic macromolecular compound having a lower refractive index than that of the core therearound, the fabrication method of low-loss plastic optical fibers according to the present invention is characterized in that a polymerization initiator and chain transfer agent are added via a distillation step of the both ingredients to a methyl methacrylate monomer distilled under a reduced pressure condition in a sealed system, the monomer is succeedingly polymerized while maintaining the reduced pressure condition, and then the resulting core polymer is subjected to melt spinning while maintaining the sealed system.

In this case, the above reduced pressure condition can be realized by such condition in which oxygen does not substantially exist, but it is to be noted that such reduced pressure condition may, of course, be achieved by other conventional methods.

In accordance with a preferred embodiment of the present invention, a polymerization initiator and chain transfer agent are added to a methyl methacrylate monomer in such that number of the dust in the aforesaid monomer is 20 or less per 10 cm light path length, i.e., substantially 1 or less per 1 mm$^3$ at any place in the aforesaid monomer, when such monomer is observed by irradiating the same by means of He-Ne laser with, e.g., 632.8 nm wavelength, the methyl methacrylate monomer to which the polymerization initiator and chain transfer agent have been added is subjected to bulk polymerization at a temperature higher than the glass transition temperature of the methyl methacrylate polymer to obtain a polymer in a sealed system in such that each content of transition metallic ions in the aforesaid polymer is 50 ppb or less iron and manganese, 10 ppb or less copper and nickel, 5 ppb or less chromium, or 2 ppb or less cobalt, the polymer is subjected to melt spinning at a temperature at which voids are not generated to form a core fiber, and a cladding of a substantially amorphous synthetic macromolecular compound having a lower refractive index than that of the core fiber thus formed therearound.

According to another preferred embodiment of the present invention, a core-forming main monomer, core-forming sub-monomer, polymerization initiator, and chain transfer agent are supplied via an atmospheric distillation or reduced pressure distillation (the term is employed herein as a synonym for "vacuum distillation") step of all these ingredients to a polymerization vessel in which bulk polymerization can be effected under a reduced pressure condition in a completely sealed system, and the so distilled monomers are subjected to bulk polymerization in the polymerization vessel to prepare a core-forming polymer. Further, it is to be understood that the aforesaid various macromolecular materials may be separately distilled from each other, or may be distilled in such a condition in which at least two types of the materials are admixed with each other.

BRIEF DESCRIPTION OF THE DRAWINGS

FIG. 2 is a flow sheet showing one example of the construction of an apparatus for fabricating a low-loss plastic optical fiber according to the present invention;

FIG. 3 is a graphical representation illustrating transmission characteristics of the plastic optical fiber fabricated in accordance with Example 1 of the present invention;

FIG. 4 is a graphical representation illustrating transmission characteristics of the plastic optical fiber fabricated in accordance with Example 3 of this invention;

FIG. 5 is a diagram showing a construction of a part for supplying additives in a conventional fabrication apparatus utilized in a comparative experiment with that of the present invention;

FIG. 6 is a graphical representation illustrating transmission characteristics of the plastic optical fiber fabricated by means of the apparatus shown in FIG. 5;

FIG. 7 is a schematic diagram showing one example of a coater for coating a cladding component utilized in the present invention;

FIG. 8 is a sectional view showing a plastic optical fiber having a core-cladding structure;

DESCRIPTION OF THE PREFERRED EMBODIMENTS

Figure 1:
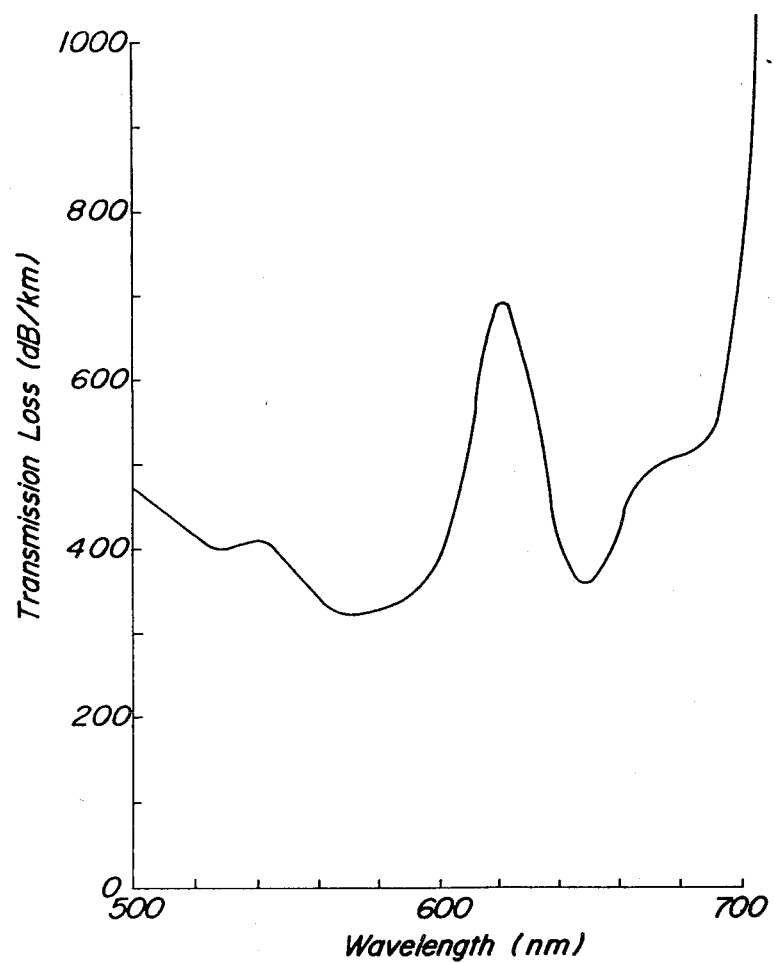
FIG. 1 is a graphical representation illustrating measured results of optical transmission characteristics in visible light region of a low attenuation all-plastic optical fiber fabricated in accordance with a conventional method.

FIG. 1 is a graphical representation illustrating optical transmission characteristics of a low attenuation all-plastic optical fiber consisting of a core made of polymethyl methacrylate and cladding of fluorine resin copolymer fabricated in accordance with a conventional method. In this case, however, values such as 350 dB/km at wavelength of 650 nm, 330 dB/km at 570 nm and 400 dB/km at 530 nm are merely obtained as minimum value of attenuation, respectively, and particularly in short wavelength side, the increase of loss due to scattering becomes remarkable.

According to the present inventors' knowledge, it became clear that the absorption loss based on high harmonics of infrared vibration absorption in carbonhydrogen bond of a plastic optical fiber comprising a polymethyl methacrylate core was lower than 10 dB/km at a wavelength of 580 nm or less. Namely, the major factor of a considerable loss in the short wavelength side of FIG. 1 is due to its scattering loss, and accordingly, it comes to be possible to fabricate a low-loss plastic optical fiber by either reducing or eliminating impurities, dust or micro voids in the synthetic high polymer molecule which causes the scattering loss in accordance with any effective process.

In this respect, all the materials to be employed in the present invention are distilled and purified, and all the steps thereof, i.e., up to the spinning step are continuously carried out in a sealed system, thereby to prevent the contamination of the final product with dust or impurities, so that the realization of a low loss plastic optical fiber is intended. According to the present invention, each of a monomer for core material, polymerization initiator and chain transfer agent is distilled and purified in a sealed condition, then a polymerization vessel is charged with the so distilled materials, and polymerization is effected by heating these materials under reduced pressure. The resulting polymer, which is maintained in the sealed condition as it stands and the temperature of which is not lowered to the glass transition temperature or less, is continuously supplied to a spinning device to spin the polymer, and as a result a fiber is obtained therein.

In the present invention, a core component of the optical fiber may be a polymer which is prepared through bulk polymerization of methyl methacrylate monomer at a temperature higher than the glass transition temperature thereof by the use of a radical polymerization initiator exhibiting a favorable activity at a temperature higher than the glass transition temperature of the methyl methacrylate polymer, for instance, the polymer comprising at least 50 mol% of methyl methacrylate unit. In order to prevent the contamination of such core polymer set forth above by a particulate substance such as dust or the like, it is insufficient to merely distill the monomer. That is, a mere use of a filter having an opening diameter of around 0.1 μm in case of adding a polymerization initiator or chain transfer agent (i.e., molecular weight modifier) to the distilled and purified monomer still causes contamination by many minute dust, and this results in light scattering. Therefore, in the present invention, a polymerization initiator and chain transfer agent are distilled in a polymerization apparatus of sealed system under a condition of reduced pressure, and the addition is effected in such a manner that only the fraction thereof is incorporated in the monomer.

As a result, it becomes possible that the contamination with minute dust is remarkably suppressed, so that loss due to light scattering can further be reduced. Consequently, the dust in the monomer to which a polymerization initiator and chain transfer agent have been added can be reduced to such an extent that number of dust is 1/100 in comparison with that in a conventional manner at any point in the apparatus, for example, when the monomer is irradiated with He-Ne laser having 632.8 nm wavelength (diameter of the light beam being about 0.5 mm) to observe the same. More specifically, such number of dust can be reduced to 0.02–20 or less per 10 cm optical path (light spots to be observed being 0.02–20 or less), i.e., 1–1000 per 1 $cm^3$ (1 or less in most cases), in other words, the concentration of dust can be decreased to substantially 1 or less per 1 $mm^3$ of the monomer, and it is also easy to keep existing 1 dust per 1 $cm^3$ of the monomer. In view of the above, it is preferable that the polymerization initiators used herein are ones which can easily be distilled under reduced pressure. Examples of such polymerization initiator include organic peroxides such as di-tert-butyl peroxide, dicumyl peroxide, cumene hydroperoxide, and the like, or azo compounds such as azo-tert-butane, azobis-isopropyl and the like.

Furthermore, it is desirable that a tail of absorption such as electron transition absorption or the like of a polymerization initiator in ultraviolet light region does not affect visible light region in order to obtain a low loss plastic optical fiber in visible light region. Among such polymerization initiators, specific examples thereof exhibiting a favorable activity at a temperature higher than the glass transition temperature of methyl methacrylate polymer include alkylazo compounds such as azo-tert-butane, azo-n-butane, azo-iso-propane, azo-n-propane, azo-cyclohexanone and the like, and particularly azo-tert-butane can preferably be used. Polymerization initiators other than azo compounds, for instance, radical polymerization initiators such as di-tert-butyl peroxide, dicumul peroxide, methyl ethyl ketone peroxide and the like have rather strong absorption in ultraviolet light region, and as a consequence, tail of the absorption affects visible light region. Moreover, azo series radical polymerization initiators other than alkylazo compounds, e.g., 2,2'-bis-azobisisobutyronitrile, azobiscyclohexane carbonitrile and the like have a comparatively small influence upon visible light region of ultraviolet absorption, but a preferable active temperature thereof is within a range of 60°–70° C., and as a consequence, polymerization must be effected at a far lower temperature than the glass transition temperature of methyl methacrylate polymer in this case.

It is also preferable that a chain transfer agent employed in the present invention is the one which can easily be distilled under reduced pressure. For such chain transfer agent, mercaptans are suitable, and specifid examples thereof include primary mercaptan such as n-butyl, n-propyl or the like mercaptan, secondary mercaptan such as sec-butyl, isopropyl or the like mercaptan, and tertiary mercaptan such as tert-butyl, tert-hexyl or the like mercaptan, or aromatic mercaptans such as phenyl mercaptan and the like.

In the present invention, a copolymer comprising at least 50 mol% of methyl methacrylate unit may be utilized as the core component other than the methyl methacrylate homopolymer as mentioned above. Examples of the copolymer component include acrylic esters such as methyl acrylate, ethyl acrylate, propyl acrylate, butyl acrylate and the like, methacrylic esters such as ethyl methacrylate, propyl methacrylate, butyl methacrylate and the like or styrene etc. In this case, since each boiling point of these copolymer components is within a range of 80° C.–160° C. under normal pressures, such copolymer component can easily be distilled similar to the case of methyl methacrylate, so that such copolymer component can be added to the methyl methacrylate monomer through the distillation. Accordingly, the content of impurities or dust can remarkably be decreased in also the case of adopting such copolymer component, thus, plastic optical fibers comprising a copolymer with low light scattering as the core can be fabricated. In order to minimize light scattering due to concentration fluctuation accompanied with the presence of a two component polymers, it is preferable that the composition of the copolymer is prepared in the form of an azeotrope composition (azeotropic composition), and if the copolymer is such one comprising at least 90 mol%, preferably at least 95 mol% of methyl methacrylate, fluidity of the copolymer in case of melt spinning is improved, so that excellent optical transmission characteristics can be obtained therein.

In the present invention, the utilization of suspension polymerization, emulsion polymerization, solution polymerization and the like polymerization processes are not preferable in case of polymerizing the core component. This is because, although a polymer of a high purity is obtained according to an industrial method in suspension or emulsion polymerization, since a large quantity of water is employed in this case, there is a fear of contamination of the polymer with foreign materials in the water, besides there is also a fear of contamination with foreign matters in the dehydration step. In also solution polymerization, since a solution is utilized, there is an apprehensive of contamination of the polymer by impurities or foreign materials in the solution, and it is further feared that the polymer is contaminated by such foreign materials in case of the isolation thereof.

For this reason, a polymer of the core component according to the invention is produced by means of bulk polymerization. In case of such bulk polymerization, if the polymerization temperature is adjusted to the one being higher than the glass transition temperature of the polymer produced, the occurrence of internal strains of the polymer at the time of heating the same at a high temperature, or of micro voids in the polymer at the time of spinning thereof in the case when the core polymer is subjected to melt spinning followed by the formation of the polymer can effectively be suppressed, so that the occurrence of loss due to light scattering inside the optical fiber fabricated can remarkably be reduced. A polymerization temperature within a range of from 100° C. to 180° C. is the most preferable, but it is required that the temperature is gradually raised to elevated temperatures in such a manner that the conversion into polymer comes to be at least 98%, and preferably 99% or more. On the contrary, if the temperature is not gradually raised to elevated temperatures, but the monomer is instantly polymerized at elevated temperatures through rapid temperature rise, the polymerization reaction runs away on account of a so-called gel effect and it brings down a cause for generating voids. Moreover, there is such a fear that the polymer is depolymerized in the case where the polymerization temperature exceeds 190° C. for a long period of time. In the present invention, since the polymer is subjected to melt spinning followed by the polymerization process of the core component without dropping the temperature of the polymer lower than the glass transition temperature thereof produced, there causes no remarkable volume change in the polymer, so that such an optical fiber with less micro voids can be obtained. As a result of the determination of impurity metallic ions in the polymer thus obtained in accordance with radiochemical analysis, it became clear that such impurity metallic ions contained 50 ppb or less iron and manganese, 10 ppb or less copper and nickel, 5 ppb or less chromium, and 2 ppb or less cobalt, and in this respect it is also easy to produce such polymer containing 20 ppb or less iron and manganese, 5 ppb or less copper and nickel, and 2 ppb or less chromium.

In the present invention, a methyl methacrylate monomer to which a polymerization initiator and chain transfer agent are added is polymerized under reduced pressure in a sealed system, and the resulting core polymer is subjected to melt spinning while maintaining the sealed state, and therefore there causes no contamination of the core polymer with dust or impurities besides formation of micro voids is suppressed therein. In addition, no contamination of the polymer with dust causes in case of spinning the polymer, thus a very low-loss optical fiber in which the scattering loss is remarkably reduced as compared with that of a conventional one can be fabricated.

The cladding component utilized in the present invention is a synthetic macromolecular compound having a lower refractive index than that of the core by at least 0.5%, preferably 2%, and the most preferable at least 5%. Particularly, when a substantially amorphous polymer is used as the cladding component, an optical fiber having excellent optical transmission characteristics can be fabricated. Examples of such cladding component include well known polymers as the cladding component such as polymers or copolymers of fluorinated esters of acryl or methyl methacrylate, copolymers of fluorine plastics such as tetrafluoroethylene, hexafluoropropylene, vinylidene fluoride, trifluoromonochloroethylene and the like, or elastomers such as silicone resin and the like.

For such cladding component, e.g., a copolymer prepared from two fluoroalkyl methacrylates having different fluoroalkyl groups from each other is especially suitable. In this case, when a copolymer obtained by combining a fluoroalkyl methacrylate having particularly excellent adhesion with respect to another fluoroalkyl methacrylate having a relatively high heat distortion temperature is employed, an optical fiber with particularly excellent optical transmission characteristics can be fabricated. Examples of such combination as stated above include copolymer of 75 mol% of 1H, 1H, 5H-octafluoropentyl methacrylate and 25 mol% of 1H, 1H, 3H-tetrafluoropropyl methacrylate, copolymer of 60 mol% of 1H, 1H, 5H-octafluoropentyl methacrylate and 40 mol% of 1H, 1H-pentafluoropropyl methacrylate, copolymer of 80 mol% of 1H, 1H, 5H-octafluoropentyl methacrylate and 20 mol% of 1H, 1H-trifluoroethyl methacrylate, and the like copolymers. If such copolymers as mentioned above are employed as the cladding material of an optical fiber of this invention, for instance, such disadvantage as a low heat distortion temperature of a cladding material in which 1H, 1H, 5H-octafluoropentyl methacrylate polymer is used as the cladding component, or as a fragile cladding material in which 1H, 1H-trifluoroethyl methacrylate polymer is employed as the cladding component can be improved. In order to obtain such a fluoroalkyl methacrylate copolymer is stated above, two types of different fluoroalkyl methacrylates are admixed with each other with each required amount thereof, a polymerization initiator and chain transfer agent are added thereto, then the resulting mixture is evacuated and deaerated, and the polymerization is carried out in the absence of oxygen. In this case, it is preferable that molecular weight of the copolymer is within a range of 20,000–100,000 in weight-average molecular weight as specifically described hereinbelow.

It is also possible to fabricate an optical fiber with excellent optical transmission by utilizing a composition obtained by fusing and incorporating fluoroalkyl methacrylate polymer with vinylidene fluoride-tetrafluoroethylene copolymer as the cladding component. This type of vinylidene fluoride-tetrafluoroethylene copolymer itself has been used as the cladding component of plastic optical fibers. When a core fiber is covered by such copolymer with a thickness of several tens $\mu$m as the cladding material, the resulting optical fiber appears to be transparent with a certain extent. However, since crystallizability remains essentially in the copolymer, the pellet thereof is cloudy, and as a result, it becomes a factor for increasing scattering in the core-cladding boundary surface. When fluoroalkyl methacrylate being essentially non-crystalline is incorporated into such type of copolymer, crystallizability of the copolymer is scattered so that a clear composition can be obtained. In this case, it is preferable that the amount of the fluoroalkyl methacrylate polymer ranges 10–50 wt%. If such an amount is less than 10 wt%, it is insufficient to completely eliminate crystallizability of vinylidene fluoride-tetrafluoroethylene copolymer, whilst if the amount exceeds 50 wt%, such advantages as faborable mechanical strength, adhesion, heat resistance and the like for the cladding component of the vinylidene fluoride-tetrafluoroethylene copolymer are lost. If the content of vinylidene fluoride in the vinylidene fluoride-tetrafluoroethylene copolymer used herein is 60 or more mol%, excellent adhesion is achieved in the resulting optical fiber.

Furthermore, if a copolymer having azeotropic composition of methyl methacrylate and styrene is adopted as the core component, the refractive index thereof becomes 1.54 and as a consequence, it becomes possible that such polymers as polymers of methacrylic esters including polymethyl methacrylate, copolymers of acrylic esters and methacrylic esters, and elastomers such as ethylene-vinyl acetate copolymers etc. may be utilized as the cladding component of the optical fiber of this invention. However, it is to be noted that the cladding component is not limited to these polymers or copolymers as enumerated above, but any synthetic macromolecular compound which is optically transparent besides satisfies the requirement as to the difference in refractive indices between the cladding and core components may be used in the present invention.

According to the present invention, in the case where a core polymer is subjected to melt spinning, such polymer which is produced by means of the polymerization at a temperature higher than the glass transition temperature of methyl methacrylate polymer is supplied to a melt spinning device without dropping the temperature of the polymer to a lower one than the aforesaid glass transition temperature. As a consequence, an optical fiber which is accompanied with no occurrence of micro voids at the time of spinning the polymer due to the generation of internal strains as well as volume change in the polymer and has low scattering loss can be fabricated.

In fabricating the plastic optical fiber according to this invention, a composite melt spinning method in which a core-cladding spinneret assembly is utilized is adopted. Other than that, a method for fabricating the plastic optical fiber by immersing a core component polymer formed into a fiber into a concentrated solution of a cladding component polymer, or a method by coating the fibrous core component polymer by the concentrated solution of the cladding component polymer through an orifice may also be employed. In the immersion or coating of the core component polymer into or by the concentrated solution of the cladding component polymer, excellent optical transmission characteristics can be obtained by such manner that the covering of the core component polymer by the cladding component polymer is effected immediately after extruding the core so as to minimize the contamination of the core component by dust or the like as much as possible.

In case of embodying the method according to the present invention, suitable is to use a fabrication apparatus which comprises a core-forming still pot for distilling a plurality of core-forming macromolecular materials under a reduced pressure condition, a polymerization initiator still pot for distilling a polymerization initiator under a reduced pressure condition, a molecular weight modifier still pot for distilling a modifier for adjusting each molecular weight of the aforesaid core-forming macromolecular materials in the absence of oxygen, and a core-forming polymerization vessel for forming a core material from the macromolecular materials distilled in the above respective still pots and the polymerization vessel which is connected to each of the aforesaid still pots through a cooling pipe and is provided with a cooling jacket.

In case of forming a core material, a monomer solution which has been supplied to the polymerization vessel and distilled therein in such a condition that optical foreign matters were completely removed by means of further atmospheric distillation or vacuum distillation is subjected to bulk polymerization and after the completion of such bulk polymerization, the resulting polymer is successively subjected to melt spinning, thereby to form the core material of plastic optical fibers.

The method according to the present invention is effected in a perfectly sealed system in the absence of oxygen under a reduced pressure condition from a step of the distillation of a core-forming monomer, polymerization initiator, and molecular weight modifier (chain transfer agent) to a melt spinning step which is carried out succeeding to a bulk polymerization step. Thus, in accordance with the present invention, the bulk polymerization is carried out in the absence of water and oxygen as well as optical foreign materials, so that such disadvantages as the contamination of the polymer with the optical foreign materials and as the obstacle due to oxidative coloring of the polymer accompanied with suspension polymerization as in a conventional method are eliminated. In addition, according to the present inventors' study, it became clear that transmission loss of the plastic optical fiber fabricated by the present invention was not so affected as much as that described in U.S. Pat. No. 3,993,834 or Japanese Laid-open Patent Application Nos. 83,046 and 83,047/1975, even if about 5% of an unreacted monomer exists in the polymer.

A monomer constituting methyl methacrylate or the like is the one which has scarcely a capability for initiating the polymerization and effect for controlling the molecular weight by itself, and accordingly, in the case where bulk polymerization is adopted for the polymerization of such monomer, it is necessary to add a polymerization initiator such as azo-tert-butane, azobisisobutylonitrile or di-t-butyl peroxide as well as a molecular weight modifier such as n-butyl mercaptan.

In accordance with the present inventors' study, it became also apparent that optical foreign materials contained in a monomer, polymerization initiator or molecular weight modifier remarkably adversely affected transmission loss of a plastic optical fiber. Such optical foreign materials cannot be removed by the use of an ordinary filter and by even the use of a commercially available polytetrafluoroethylene filter with the smallest opening diameter, 0.1 μm which is not eroded by a monomer, polymerization initiator and molecular weight modifier as disclosed in U.S. Pat. No. 4,161,500. This is because window in loss of a plastic optical fiber is in visible light region (0.4–0.8μm) and scattering loss adversely affecting transmission loss is definitely increased by the optical foreign materials each having a dimension corresponding to about 1/10–1/20 or less length of the wavelength, i.e., a dimension being within a range of 0.08–0.02μm or less, so that the optical foreign materials each having a dimension of 0.1μm or less cannot be removed by means of even the aforesaid filter with the smallest opening diameter.

The present invention can dissolve at once such disadvantage as set forth above, because the monomer, polymerization initiator and molecular weight modifier to be used are subjected to distillation. Distillation principle relates to a method for utilizing differences in the boiling points of materials to be distilled, and whether or not a certain material can be distilled depends generally on molecular weights of the objects to be distilled. Each molecular weight of the monomer, polymerization initiator and molecular weight modifier employed in the invention is around 1,000 at the most and accordingly, the materials of such molecular weight can sufficiently be distilled by means of atmospheric distillation or of, also, vacuum distillation under a high vacuum of around $10^{-5}$–$10^{-7}$ mmHg. On the other hand, the optical foreign materials are not compatible with the monomer, polymerization initiator, molecular weight modifier, or polymer, and a molecular weight of the optical foreign materials is generally within a range of from 1,000 to around several hundred million, so that such optical foreign matters never evaporate even under a high vacuum of around $10^{-5}$–$10^{-7}$ mmHg.

As described above, when each macromolecular material is distilled and introduced into a polymerization vessel, such polymerization vessel is very easily charged with a monomer solution containing the polymerization initiator and molecular weight modifier in which concentration of the optical foreign materials is represented by the number of the foreign materials like 1 or less per 1 cm³. Then followed bulk polymerization of such monomer and as a result, a core-forming polymer in which concentration of the foreign materials is 1 or less per 1 cm³ can very easily be produced. In this case, the concentration of optical foreign materials can be measured by such manner that the monomer solution to be measured is irradiated with He-Ne laser having, for example, 632.8 nm wavelength (diameter of the light flux being about 0.5 mm) to determine how many foreign matters exist in a prescribed optical path, e.g., 10 cm thereof.

In the present invention, a monomer containing the polymerization initiator and molecular weight modifier is subjected to bulk polymerization at a temperature higher than the glass transition temperature of the final product polymer. Thus, a final rate of polymerization thereof reaches 95% or more, or 99.9% or more so that the unreacted monomer decreases to be substantially negligible, and the temperature of the polymer is close to a region of the temperature in melt spinning. Consequently, it becomes possible that such polymer is subjected to melt spinning as it stands, so that a step being the one for removing the unreacted monomer during which there is such a fear that the polymer is exposed under the presence of optical foreign materials or oxygen can be avoided, and such avoidance is very advantageous in view of the fabrication of a low-loss plastic optical fiber.

Moreover, according to the present inventors' knowledge, the contamination of a cladding material by coloring or optical foreign materials is not suitable in view of transmission characteristics in case of fabricating low-loss plastic optical fibers. This is because a light which passes through the core material and is totally reflected by the interfacial boundary between the core and cladding oozes out towards the cladding portion by a length corresponding to substantially wavelength of the transmitted light or length several times larger than that, i.e., 0.4 μm to around 5 μm, when viewed microscopically, and then the light transmits again into the core portion. Therefore, if the cladding portion from which the light oozes out has been colored or if optical foreign materials exist in the cladding portion, the light is absorbed or scattered at such portion. For this reason, it is preferable that the cladding material is also polymerized in the absence of optical foreign materials and oxygen by means of a similar manner to that of the core material.

Then, one embodiment of an apparatus for embodying the fabrication method according to the present invention will be shown in FIG. 2, in which reference numeral 1 designates a core-forming main monomer still pot, 2 a core-forming sub-monomer still pot, 3 a polymerization initiator still pot, 4 a chain transfer agent still pot, 5, 6, 7 and 8 discharge valves for distillation residues in the still pots 1, 2, 3 and 4, respectively, 9 a core-forming main monomer reservoir, 10 a core-forming sub-monomer reservoir, 11 a polymerization initiator reservoir, and 12 a chain transfer agent reservoir. These reservoirs 9. 10. 11 and 12 are arranged in such that they are communicated with the still pots 1, 2, 3 and 4 through feed rate regulating valves 13, 14, 15 and 16, respectively, and a main monomer, sub-monomer, polymerization initiator and chain transfer agent are supplied from the reservoirs to the still pots 1, 2, 3 and 4, respectively, at each controlled rate of feed in respect of the above macromolecular components. Capillaries 17, 18, 19 and 20 introduce an inert gas or nitrogen gas into the still pots 1, 2, 3 and 4, respectively. Reference numeral 21 designates a polymerization vessel having a heating-cooling cylindrical portion, the inner diameter of which, for example, is 10–100 mm, and provided with a metering meniscus. Each distillate liquor obtained by cooling and condensing each vapor fed from each still pot 1, 2, 3 or 4 in each cooling pipe 22, 23, 24 or 25 is supplied to the polymerization vessel 21 through each vacuum-pressure regulating needle cock 26, 27, 28 or 29 made of polytetrafluoroethylene, and such distillate liquor is stored in the polymerization vessel 21. The inner wall of the polymerization vessel 21 is covered with a corrosion-resistant material. Reference numerals 30, 31 and 32 designate polytetrafluoroethylene vacuum-pressure regulating needle cocks, respectively, and introgen gas introduced from the needle cock 30 is supplied to the polymerization vessel 21 through a filter 33 having, for example, 0.1 μm opening diameter and for removing optical foreign matters in the nitrogen gas and further through the needle cock 31. The polymerization vessel 21 is communicated to a vacuum pump 34 through the needle cocks 31 and 32, and the outer periphery of the cylindrical portion of the polymerization vessel 21 is surrounded by a cooling jacket 35. The bottom end portion of the polymerization vessel 21 is communicated to a core-forming nozzle 37A disposed inside a double spinning nozzle 37 through a polymer feed rate regulating valve 36. From an inlet 38 for a cladding material, a cladding forming macromolecular solution is supplied into a cladding forming nozzle 37B which is the outside nozzle and constructs the double spinning nozzle 37 together with the core-forming nozzle 37A. In this arrangement, a plastic optical fiber 39 having a core-cladding structure is spun from the nozzle 37, and the resulting fiber 39 is taken up by a fiber take-up drum 41 through a pulley 40. The nozzle 37 is provided with a screw or mechanism which can be pressurized by means of an inert gas or nitrogen gas, and melt spinning is effected by utilizing such screw or mechanism in the nozzle 37. Further, a clear heater element of tin oxide is applied on each outer surface of the still pots 1, 2, 3 and 4, polymerization vessel 21, double spinning nozzle 37, and inlet 38 for the cladding material in order to heat these parts. All parts in the above apparatus are made from quartz, and each pipe portion is formed into a pressure-resistant internally thickened pipe. In FIG. 2, reference numerals 42, 43, 44 and 45 designate further fractionating pipes, respectively, and 46 and 47 mechanisms for preventing bumping, respectively.

In this arrangement, methyl methacrylate monomer containing the polymerization initiator and chain transfer agent added to the polymerization vessel 21 after the distillation thereof is polymerized in the vessel in which reduced pressure condition is maintained, and the resulting polymer is succeedingly spun through the nozzle 37A without lowering the temperature of the polymer to the one lower than the glass transition temperature of the polymer.

For a cladding material extruded from the cladding forming nozzle 37B, a composition prepared by fusing and incorporating fluoroalkyl methacrylate polymer with vinylidene fluoride-tetrafluoroethylene copolymer is suitable.

In case of the polymerization, it is necessary to gradually raise the temperature of the mixture to elevated temperatures so as to attain at least 98%, and preferably 99% or more of the conversion into the polymer. On the contrary, when the temperature is not gradually raised to elevated temperatures, but is instantly raised to such elevated temperatures and the polymerization is effected thereat, the polymerization reaction rushes due to a so-called gel effect, and it brings down a cause for generating voids. On one hand, if the polymerization temperature exceeds 190° C. for a long period of time, there is a fear of depolymerization of the polymer.

In case of applying a cladding component on the core polymer spun, a composite melt spinning method in which a core-cladding spinneret assembly is utilized is adopted, besides such a method by immersing a core component polymer formed into a fiber into a concentrated solution of a cladding component polymer or method by coating the fibrous core component polymer with the concentrated solution of the cladding component polymer through an orifice may also be employed. In case of employing a copolymer consisting of two types of fluoroalkyl methacrylates containing different fluoroalkyl groups as a cladding component, especially the coating method is suitable. In this case, it is preferable that a molecular weight of such copolymer as set forth above is within a range of 20,000–100,000 in weight-average molecular weight. If the molecular weight is 100,000 or more, a low viscosity sufficient for being capable of coating cannot be obtained in the case where the aforesaid copolymer is applied on the core fiber by means of the coating method, whilst if the molecular weight is 20,000 or less, a suitable strength for the cladding material cannot be obtained. In case of producing fluoroalkyl methacrylate copolymer, dissolved air in the monomers is removed, then the monomers are subjected to bulk polymerization, so that there is no generation of micro voids and coloring of a cladding component by oxidation in the case when the copolymer is applied on the core component, and as a consequence, an optical fiber with a low loss in the core-cladding boundary surface can be fabricated.

The present invention will be described hereinbelow in more detail by referring to the following examples, but it is to be understood that the invention is not restricted to these examples. In the examples, a tungsten-halogen lamp was utilized for measuring optical transmission characteristics of the optical figers obtained.

EXAMPLE 1

In the use of the apparatus shown in FIG. 2, first, valves 13, 5, 15, 7, 6, 14, 8, 16, 36 and 30 are closed, while valves 26, 27, 28, 29, 31 and 32 are opened, respectively, and the whole apparatus is made to be vacuum condition (reduced pressure condition) by means of the vacuum pump 34. Then, the cock 32 is closed and the cock 30 is opened, whereby the atmosphere in the apparatus is replaced by dry nitrogen to obtain oxygen-absent condition. In this condition, the core-forming main monomer reservoir 9 is charged with methyl methacrylate, likewise the core-forming sub-monomer reservoir 10 with ethyl acrylate, the polymerization initiator reservoir 11 with azo-t-butane, and the molecular weight modifier 12 with n-butyl mercaptan, and each of these ingredients is introduced to each still pot 1, 2, 3 or 4, respectively.

That is, in the completely sealed system, the polymerization vessel 21 has been cooled at −5° C. by means of the cooling jacket 35 in the absence of oxygen, then, the cocks 26, 27 and 29 are closed while the cock 28 is kept opening, and the cock 15 is opened to introduce azo-t-butane from the polymerization initiator reservoir 11 to the still pot 3. In this case, the still pot 3 has previously been heated at 100° C. Thereafter, the cock 30 is closed whilst the cock 32 is opened to reduce the pressure of the sealed system to 200 mmHg, and nitrogen gas is introduced from the capillary 19 to the still pot 3, thereby to supply the vapor of azo-t-butane into the cooling pipe 24. The cooling pipe 24 has previously been cooled by allowing cold water to flow therearound, thereby to condense the vapor of azo-t-butane, and 1 ml of the resulting azo-t-butane solution is introduced into the polymerization vessel 21.

Next, the cock 28 is closed and the cock 29 is opened while keeping the cocks 26 and 27 closing, and further the cock 16 is opened thereby introducing n-butyl mercaptan from the molecular weight modifier reservoir 12 to the still pot 4. This still pot 4 has beforehand been heated at 80° C. Then, nitrogen gas is introduced from the capillary 20 to the still pot 4 while maintaining 200 mmHg pressure in the sealed system to introduce the vapor of n-butyl mercaptan into the cooling pipe 25 being cooled by allowing cold water to flow therearound and the vapor of n-butyl mercaptan is condensed therein, and 3 ml of the resulting n-butyl mercaptan liquor is introduced into the polymerization vessel 21 which has been cooled beforehand at −5° C.

Next, the cock 29 is closed and the cocks 27 and 14 are opened while keeping the cocks 26 and 28 closing, thereby introducing ethyl acrylate from the core-forming sub-monomer reservoir 10 to the still pot 2. The still pot 2 is heated at 80° C. while holding the pressure of the sealed system 200 mmHg, nitrogen gas is introduced from the capillary 18 to the still pot 2, thereby to introduce the vapor of ethyl acrylate into the cooling pipe 23 and the vapor of ethyl acrylate is condensed therein, and 100 ml of the resulting liquid ethyl acrylate is supplied to the polymerization vessel 21 cooled at −5° C.

Thereafter, the cock 27 is closed and the cocks 26 and 13 are opened while holding the cocks 28 and 29 closing, thereby to introduce methyl methacrylate from the core-forming main monomer reservoir 9 to the still pot 1. The still pot 1 is heated at 110° C. while keeping the pressure of the sealed system 200 mmHg, nitrogen gas is introduced from the capillary 17 to the still pot 1, thereby introducing the vapor of methyl methacrylate into the cooling pipe 22 and the vapor thereof is condensed therein, and 900 ml of the resulting liquid methyl methacrylate is fed to the polymerization vessel 21 being cooled at −5° C.

As a result of each reduced pressure distillation as mentioned above, a macromolecular mixed solution consisting of 94.6 mol% of methyl methacrylate as the core-forming main monomer, 5 mol% of ethyl acrylate as the core-forming sub-monomer, 0.1 mol% of azo-t-butane as the polymerization initiator, and 0.3 mol% of n-butyl mercaptan as the molecular weight modifier is obtained. Next, the cock 26 is closed while keeping the cocks 27, 28 and 29 closing, and further the cock 32 is closed, thereafter the cock 30 is opened to introduce nitrogen gas into the polymerization vessel 21 and during this introduction, the polymerization vessel is pressurized at 3 kg/cm³. In such completely sealed system as stated above, the polymerization vessel 21 is heated in the absence of oxygen at a temperature of 130°–150° C. for 1–10 days, and the vessel is further heated for around one more day at 180° C. to complete the bulk polymerization. Thereafter, the cocks 31 and 36 are opened to extrude the molten polymer through the nozzle 37A and at the same time, a molten cladding material, for example, molten polymer of fluoroalkyl methacrylate is supplied via the inlet 38 for heated cladding material to extrude the molten polymer through the nozzle 37B, whereby double melt spinning is effected while maintaining the temperature of the nozzle 37 within a range of 130°–150° C. The resulting fiber 39 is sufficiently cooled, and then it is taken up by the take-up drum 41 through the pulley 40. In the present example, the plastic optical fiber 39 having such core-cladding structure of 1.2 mm fiber diameter, 1.0 mm core diameter, and 5% refractive index difference was obtained.

In this example, when optical foreign materials contained in the monomer solutions or the polymer solution thereof being obtained by distilling the same are calculated in terms of number of light spot per 10 cm optical path by irradiating such solution or solutions with He-Ne laser having 632.8 nm wavelength (diameter of the light flux being about 0.5 mm), such number was 1 per 1 cm³. Furthermore, transmission loss characteristics of the resulting fiber are as in the graphical representation illustrated in FIG. 3 in which each transmission was 90 dB/km, 88 dB/km or 178 dB/km at each wavelength 523 nm, 568 nm or 650 nm, respectively. From the result of these transmission losses, it is understood that they are remarkably lower values than that of a conventional plastic optical fiber, for instance, the minimum loss 274 dB/km (656 nm) of the plastic optical fiber in which polymethyl methacrylate series polymer is used as the core material as disclosed in U.S. Pat. No. 4,161,500.

EXAMPLE 2

In accordance with the same process as in Example 1, a macromolecular mixed solution consisting of 94.6 mol% of methyl methacrylate as the core-forming main monomer, 5 mol% of ethyl acrylate as the core-forming sub-monomer, 0.1 mol% of di-t-butyl peroxide as the polymerization initiator, and 0.3 mol% of n-butyl mercaptan as the molecular weight modifier is prepared in the polymerization vessel 21 through each reduced pressure distillation step of the ingredients. Then, according to the same manner as in Example 1, the polymerization of the macromolecular mixed solution is carried out at a temperature within a range of 100°–120° C. for 6–10 hours, range of 120°–130° C. for 4–10 hours, range of 140°–150° C. for 2–6 hours, and range of 180°–190° C. for 1–55 hours, respectively. Thereafter, while maintaining the temperature of the nozzle 37 within a range of 130°–150° C., the double melt spinning is carried out by employing fluoroalkyl methacrylate as the cladding material together with the aforesaid core material through the nozzle 37 under 5.0 kg/cm² nitrogen pressure. The resulting fiber 39 was taken up on the drum 41 at a rate of 10 m per minute. The plastic optical fiber 39 thus obtained had 0.95 mm core diameter and 0.22 mm film thickness in the clad portion. This plastic optical fiber of the present example had such low transmission loss values as 225 dB/km and 220 dB/km at wavelengthes 572 nm and 652 nm, respectively.

EXAMPLE 3

In accordance with the same process as in Example 1, a macromolecular mixed monomer solution consisting of 94.6 mol% of methyl methacrylate as the core-forming main monomer, 5 mol% of ethyl acrylate as the core-forming sub-monomer, 0.1 mol% of 1,2-dicarboethoxy-1,2-dicyano-1,2-diphenylethane as the polymerization initiator, and 0.3 mol% of t-butyl mercaptan as the molecular weight modifier is prepared in the polymerization vessel 21 through each reduced pressure distillation step of all the ingredients. In this case, the polymerization initiator is solid in normal condition and the vapor pressure thereof is very low. Therefore, in case of preparing the monomer solution, the polymerization initiator is introduced into the polymerization vessel 21 after the initiator was heated in the still pot 3 and cooling pipe 24 at a temperature ranging 300°-350° C. under high vacuum of $10^{-4}$ mmHg. The following procedures are similar to those in Example 1, i.e., the polymerization of the mixed monomer solution is carried out at a temperature within a range of 100°-120° C. for 6-10 hours, range of 120°-130° C. for 4-10 hours, range of 140°-150° C. for 2-6 hours, and range of 180°-190° C. for 1-5 hours, respectively. Thereafter, while maintaining the temperature of the nozzle 37 within a range of 130°-150° C., the double melt spinning is carried out by using fluoroalkyl methacrylate as the cladding material together with the aforesaid mixed monomer solution as the core material through the nozzle 37 under 5.0 kg/cm² nitrogen pressure. The resulting fiber 39 was taken up on the drum 41 at a rate of 10 m per minute. The plastic optical fiber 39 thus obtained had 0.90 mm core diameter and 0.25 mm film thickness in the clad portion. The transmission loss characteristics of this fiber are illustrated by the graphical representation in FIG. 4. As is seen from FIG. 4, the plastic optical fiber of the present example had such low values of transmission loss as 125 dB/km and 196 dB/km at wavelengths 570 nm and 652 nm, respectively.

In eah of Examples 1, 2 and 3, all the core-forming main monomer, core-forming sub-monomer, polymerization initiator and molecular weight modifier are separately distilled from each other, but the distillation may be effected by such manner that at least two or all the macromolecular materials are admixed with each other prior to the distillation thereof, and then the resulting admixture is subjected to a single distillation to obtain a distillate solution. Thus, the distillate solution may be subjected to bulk polymerization.

Comparative Example 1

In this example, transmission loss of the plastic optical fiber fabricated according to the present invention will be compared with that of another plastic optical fiber fabricated in accordance with a conventional method. For this comparison, such a case in which a core-forming monomer is introduced to a polymerization vessel in accordance with a distillation process and on the other hand, a polymerization initiator and molecular weight modifier are supplied to the polymerization vessel according to a filtration process in which both the ingredients are permitted to pass through a filter having 0.1 μm opening diameter as disclosed in U.S. Pat. No. 4,161,500, will be described hereinbelow. In comparative Example 1, devices encircled with the broken line in FIG. 5 are inserted between the cock 28 and cooling pipe 24 among the devices shown in FIG. 2. Namely, an additive reservoir 51 for storing the polymerization initiator and molecular weight modifier as additives is connected to the polymerization vessel 21 through a filter 52 having 0.1 μm opening diameter and the cock 28.

First, the valves 13, 5, 28, 6, 14, 8, 16, 36 and 30 are closed, whilst the valves 26, 28, 27, 29, 31 and 32 are opened, respectively, then the whole apparatus is made to be vacuum condition by means of the vacuum pump 34. Thereafter, the cock 32 is closed, whilst the cock 30 is opened, and then, the atmosphere in the apparatus is replaced by dry nitrogen passed through the filter 33 having 0.1 μm opening diameter. In this condition, the core-forming main monomer reservoir 9 is charged with methyl methacrylate, likewise, the core-forming sub-monomer reservoir 10 with ethyl acrylate, and the additive reservoir 51 with 30 ml of n-butyl mercaptan as the molecular weight modifier and 10 ml of azo-t-butane as the polymerization initiator. The polymerization vessel 21 is cooled to $-5°$ C., and the cocks 26, 27 and 29 are closed, whilst the cock 28 is opened, thereby to introduce 4 ml of the additive solution from the additive reservoir 51 to the polymerization vessel 21 through the filter 52. Then, the cock 28 is closed, and methyl methacrylate as the core-forming main monomer and ethyl acrylate as the core-forming sub-monomer are supplied to the polymerization vessel 21 according to distillation process by a manner similar to that mentioned in Example 1.

Concentration of optical foreign materials in the monomer solution or polymer solution thus prepared was measured by irradiating the solution with He-Ne laser having 632.8 nm wavelength, and as a result, 2,000 or more per 1 cm³ of the foreign materials were observed. Transmission loss characteristics of the plastic optical fiber fabricated in Comparative Example 1 were illustrated by the graphical representation in FIG. 6.

As apparent from the comparison of the transmission loss characteristics illustrated in FIGS. 3 and 4 with those shown in FIG. 6, the fiber containing 1 or less optical foreign materials per 1 cm³ fabricated according to the invention is remarkably different from the fiber containing 2,000 or more optical foreign materials per 1 cm³ fabricated in accordance with a conventional method in magnitude of the loss in a shorter wavelength side than 600 nm wavelength. That is, if the wavelength of light becomes shorter, the influence of light scattering due to the optical foreign materials contained in a fiber comes to more strongly be seen, and the degree of which depends on the concentration of the optical foreign materials. Accordingly, a smaller concentration of the optical foreign materials results in a more decreased loss of such fiber. The transmission loss of the plastic optical fiber fabricated in Example 1 of the present invention was 90 dB/km at 522 nm wavelength, 88 dB/km at 568 nm wavelength and 178 dB/km at 650 nm wavelength, respectively, and when these results are compared with those of the plastic optical fiber fabricated by the use of the conventional apparatus described in Comparative Example 1, the fiber of Example 1 is further low loss by about 300-400 dB/km in the vicinity of wavelengths 520 nm and 570 nm. Thus, according to the method of the present invention, a plastic optical fiber with excellent loss characteristics as compared with that fabricated in accordance with a conventional partly filtration method can be fabricated.

EXAMPLE 4

Figure 9:
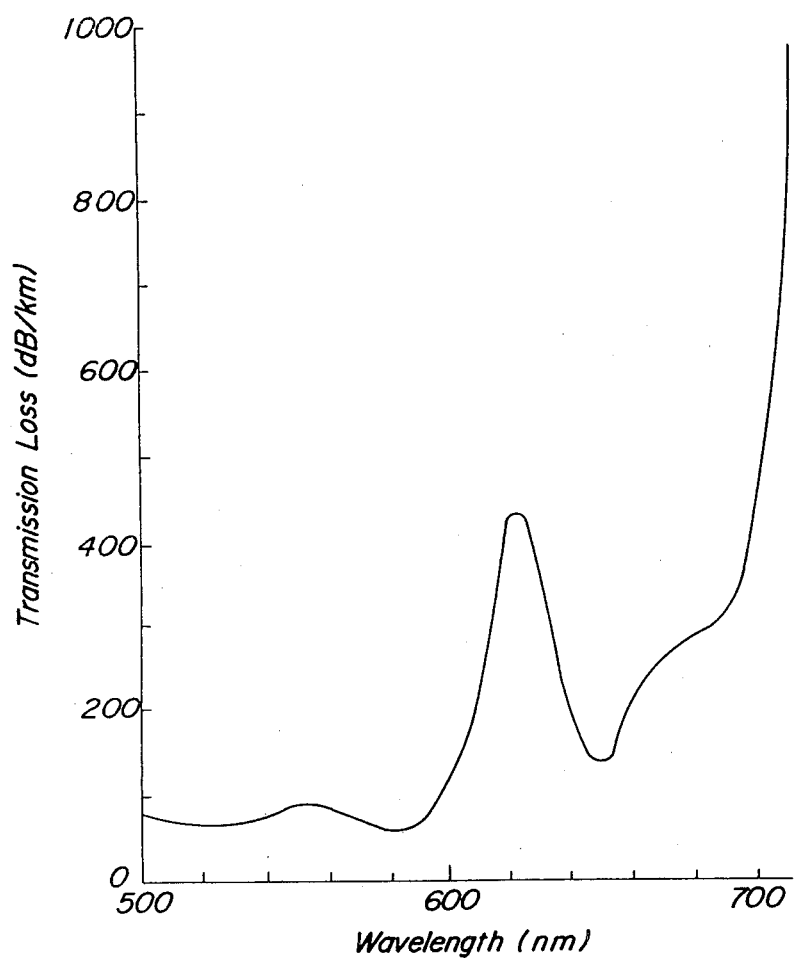
FIG. 9 is a graphical representation illustrating measured results of optical transmission characteristics in visible light region of the low-loss plastic optical fiber consisting of polymethyl methacrylate prepared in accordance with Example 4 of the invention as the core component and a copolymer of 70 mol% 1H, 1H, 5H-octafluoropentyl methyacrylate and 30 mol% 1H, 1H, 3H-tetrafluoropropyl methacrylate as the cladding component.

Methyl methacrylate as the monomer, azo-tert-butane as the polymerization initiator of n-butyl mercaptan as the chain transfer agent is supplied to each of the fixed still pots 1, 3 and 4, respectively, the whole system including them is made to be sealed condition, and then the pressure of the system is reduced to 150 mmHg. Following to the reduction of pressure, the main monomer still pot 1 is heated, and the monomer is transferred to the polymerization vessel 21. In this case, if the monomer has previously been distilled to collect only the intermediate fraction thereof, such fraction from the initial boiling point to a prescribed amount is introduced into the polymerization vessel, whilst if the monomer has not previously been distilled, the fraction at the initial boiling point is discharged by opening and closing the core-forming nozzle 37A, and then the prescribed amount of the intermediate fraction is supplied to the polymerization vessel 21. Succeedingly, the polymerization initiator still pot 3 and chain transfer agent still pot 4 are heated, and then, each prescribed amount of the polymerization initiator and chain transfer agent are transferred to the polymerization vessel 21. After sufficiently agitating the contents of the polymerization vessel 21, the resulting mixture is irradiated with He-Ne laser, thereby detecting the remaining dust. As a result, only 1–0.02 or less, or 0.02 or less in most cases of light spot per 10 cm optical path, i.e., merely 1 or less of dust per 1 cm³ was observed. The polymerization vessel 21 is heated while maintaining the reduced pressure condition, the contents in the vessel is subjected to bulk polymerization at 135° C. for 12 hours, then, the temperature of the contents is gradually raised to increase the rate of polymerization, and finally the polymerization is completed at 180° C. after the period of time for 8 hours, thereby to produce a core component polymer. The temperature of the polymer is raised to 200° C. under the condition in which fluidity of the polymer is held, and 0.65 mm core fiber is obtained through the core-forming nozzle 37A by pushing the polymer with dry nitrogen fed through the vacuum-pressure regulating needle cocks 30 and 31. Furthermore, a cladding component is prepared by a manner as described hereinbelow. That is, azoisobutylonitrile as the polymerization initiator and n-butyl mercaptan as the chain transfer agent are added to a mixture of 70 mol% 1H,1H,5H-octafluoropentyl methacrylate and 30 mol% 1H,1H,3H-tetrafluoropropyl methacrylate, dissolved oxygen is removed from the resulting mixture under reduced pressure condition of 1 mmHg, and then the polymerization is effected in the absence of oxygen at 60° C. for 8 hours. Thereafter, the temperature of the mixture is gradually raised up to 120° C. and the polymerization is completed at this temperature, and the resulting copolymer exhibited 35,000 weight-average molecular weight. The cladding component copolymer thus obtained is applied in a molten state to a coater 51 shown in FIG. 7. The coater 51 is being heated by a heater 52, and the aforesaid core fiber prepared is immediately introduced into the molten cladding component copolymer through an orifice 53, whereby the core fiber is continuously coated by the cladding component. Then, the resulting product is cooled to obtain a composite optical fiber 54 consisting of a core 55 and cladding 56 having 0.10 mm film thickness as shown in FIG. 8. The optical transmission characteristics of the optical fiber thus fabricated are illustrated by the graphical representation in FIG. 9. As is apparent from FIG. 9, values of the transmission loss were 62 dB/km at 516 nm wavelength, 58 dB/km at 566 nm wavelength, and 130 dB/km at 648 nm wavelength, respectively, so that, a plastic optical fiber having substantially identical characteristics to those of an inorganic glass optical fiber comprising a plastic cladding was obtained. Moreover, as is understood from the comparison of the transmission characteristics of the plastic optical fibers according to the invention with those, as illustrated in FIG. 1, of a low attenuation plastic optical fiber fabricated in accordance with a conventional method, increase of the loss due to scattering in a shorter wavelength side than 580 nm is scarcely observed in the plastic optical fibers of this invention, so that they have such advantage that dust, micro voids or the like which may cause scattering loss is remarkably reduced.

EXAMPLE 5

Figure 10:
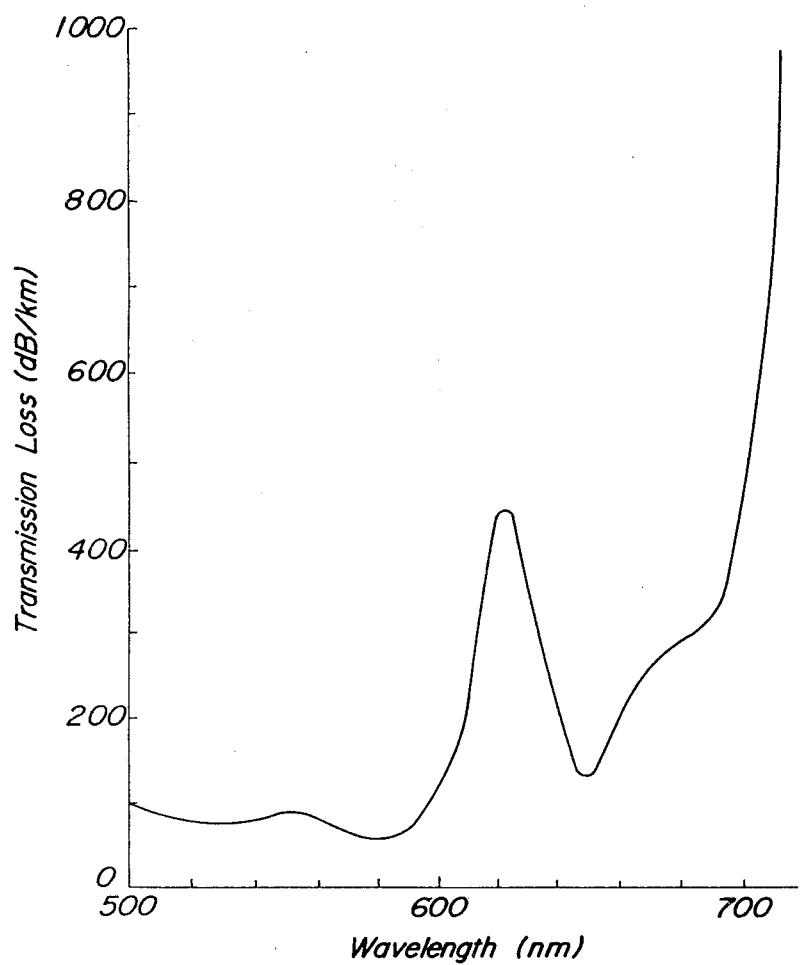
FIG. 10 is a graphical representation illustrating measured results of optical transmission characteristics in visible light region of the low-loss plastic optical fiber consisting of the copolymer of 90 mol% methyl methacrylate and 10 mol% ethyl acrylate prepared in accordance with Example 5 of the invention as the core component and a uniform and clear composition prepared by adding 25% by weight of 1H, 1H, 3H-tetrafluoropropyl methacrylate polymer to 75% by weight of a copolymer of 85 mol% vinylidene fluoride and 15 mol% tetrafluoroethylene, and fusing and admixing the same with each other as the cladding component.

In Example 4, the still pot 1 is charged with 90 mol% of methyl methacrylate and the still pot 2 is charged with 10 mol% of ethyl acrylate, and further each prescribed amount of the monomer, polymerization initiator, and chain transfer agent is transferred to the polymerization vessel 21 under a reduced pressure condition in accordance with a similar manner to that of Example 1. Number of the dust contained in the resulting mixture which is observed by irradiating the mixture with He-Ne laser was 1/cm³ or less. The mixture is subjected to bulk polymerization at 140° C. for 10 hours while maintaining the reduced pressure condition, then the temperature of the mixture is gradually raised up to 180° C. and the polymerization is finished at this temperature to obtain a core polymer. On the other hand, 25% by weight of 1H,1H,3H-tetrafluoropropyl methacrylate polymer is added to 75% by weight of a copolymer of 85 mol% vinylidene fluoride and 15 mol% tetrafluoroethylene, the resulting mixture is fused and admixed to obtain a uniform and clear composition as the cladding component, and the resulting composition is supplied through the inlet 38 for cladding material. Thereafter, temperatures of the polymerization vessel 21 as well as the nozzle are maintained at 190° C., and the core polymer is pushed with dry nitrogen by regulating the vaccum-pressure regulating needles 30 and 31 and at the same time, the cladding material is supplied through the inlet for cladding material, whereby double melt spinning is carried out through the nozzle 37 to obtain a composite fiber having 0.6 mm core diameter and 0.10 mm cladding film thickness. Optical transmission characteristics of the resulting optical fiber are illustrated by the graphical representation in FIG. 10. As is clear from FIG. 10, there are windows of low loss at wavelengths 516 nm and 566 nm, and especially, a remarkably low loss value of attenuation amount such as 62 dB/km at 566 nm is obtained in the plastic fiber of this example as compared with that of a conventional plastic optical fiber. Since the core fiber is copolymer in the present example, some upstand of loss value in short wavelength side is observed, but such low loss optical fiber having substantially equivalent loss value in comparison with that of methyl methacrylate polymer in the window at wavelength 566 nm or 648 nm is obtained.

EXAMPLE 6

A composite fiber was fabricated in accordance with the same manner as in Example 4 except that a copolymer having 50,000 weight-average molecular weight was utilized as the cladding component and such copolymer was prepared by polymerizing a mixture of 80 mol% 1H,1H,5H-octafluoropentyl methacrylate and 20 mol% 1H,1H-trifluoroethyl methacrylate in the absence of oxygen under 1 mmHg reduced pressure condition.

The lowest loss window of the fiber fabricated was at 566 nm and the attenuation amount thereof was 60 dB/km. Further, a low loss window of 135 dB/km was also observed at wavelength of 648 nm.

EXAMPLE 7

A composite fiber was fabricated in accordance with the same manner as in Example 5 except that a uniform and clear composition was employed as the cladding component and such composition was prepared by adding 40% by weight of 1H,1H-octafluoropentyl methacrylate polymer to 60% by weight of a copolymer consisting of 88 mol% vinylidene fluoride and 12 mol% of tetrafluoroethylene and fusing and admixing the resulting mixture.

The lowest loss window of the optical fiber thus fabricated was at 566 nm and the attenuation amount thereof was 65 dB/km. In addition, a low loss window 140 dB/km was also observed at wavelength of 648 nm.

Comparative Example 2

In Example 4, 1H,1H-trifluoroethyl methacrylate polymer is utilized as the cladding component and according to a similar manner to that of Example 4, a composite fiber was obtained. However, remarkable peeling of the cladding material from the core fiber was observed in the resulting fiber, and the loss value in the lowest loss window was the one over 180 dB/km.

Comparative Example 3

In Example 5, a copolymer consisting of 75 mol% vinylidene fluoride and 25 mol% tetrafluoroethylene is utilized and a composite fiber was obtained in accordance with a similar manner to that of Example 4. The loss value in the lowest loss window was the one exceeding 150 dB/km.

EXAMPLE 8

Figure 11:
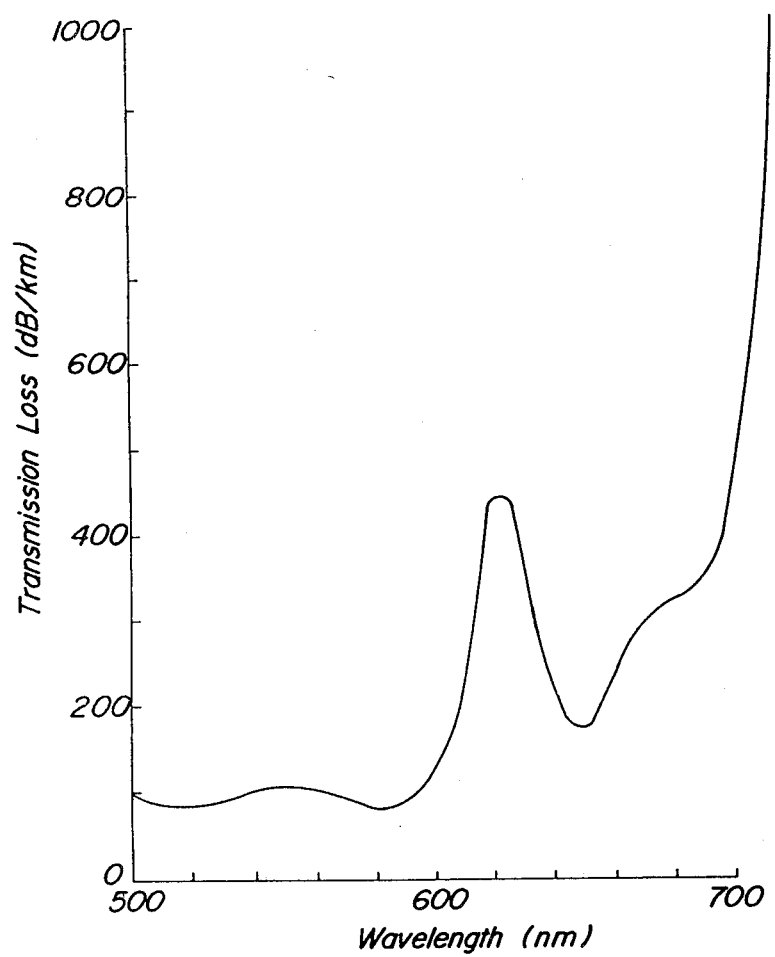
FIG. 11 is a graphical representation illustrating measured results of optical transmission characteristics in visible light region of the low-loss plastic optical fiber comprising the polymethyl methacrylate prepared in accordance with Example 8 of this invention as the core component.

To the methyl methacrylate monomer distilled in the polymerization apparatus shown in FIG. 2 were added 10 m mol/l of azo-tert-butane as the initiator and 40 m mol/l of n-butyl mercaptan as the chain transfer agent, and each of them was added by means of a distillation step. As a result of detection of the dust in the monomer with He-Ne laser, only light spots such as 1–0.02 or less, and 0.02 or less per 10 cm optical path in most cases were observed. This monomer was sufficiently admixed with the other ingredients and subjected to bulk polymerization at 130° C. for 24 hours, then the temperature of the mixture was gradually raised to increase the rate of polymerization up to 180° C. and the polymerization was finished at this temperature, thereby to obtain a core component polymer. A part of the polymer was taken out and the trasition metallica ion contents thereof were measured, and as a result it was clear that 20 ppb iron, and 2 ppb or less cobalt and nickel were contained in the polymer. This polymer was subjected to melt spinning at 190° C. to obtain a fiber having 0.90 mm diameter. On one hand, Silicone resin was adopted as the cladding component. Through an orifice, the core fiber was introduced into the silicone resin to continuously coat the core fiber with the cladding component, and the so coated core fiber was cured, whereby a composite fiber having a core-cladding structure in which the film thickness of the cladding component being 0.10 mm was fabricated. Optical transmission characteristics of the optical fiber thus obtained are illustrated by the graphical representation in FIG. 11. As is apparent from FIG. 11, low loss windows existed at wavelengths 520 nm, 570 nm and 650 nm, respectively, and particularly, the loss became 85 dB/km at wavelength 520 nm or 570 nm.

EXAMPLE 9

A polymer which was prepared by the same manner as in Example 8 except that 5 m mol/l of di-tert-butyl peroxide was used as the polymerization initiator was utilized as the core component polymer (the dust in the monomer being 2–0.02 or less per 10 cm optical path, and transition mmetallic ion contents being 30 ppb iron, 5 ppb or less nickel and 2 ppb or less cobalt). On one hand, a copolymer of vinylidene fluoride and tetrafluoroethylene was adopted as the cladding component. As a result, a composite fiber with 0.65 mm core diameter and 0.10 mm film thickness of the cladding component was fabricated by extruding each component polymer through a core-cladding spinneret assembly at 210° C. The lowest loss window of the optical fiber thus obtained resided in at wavelength 570 nm and the Attenuation amount thereof was 190 dB/km. In addition, a low loss window 210 dB/km was also observed at wavelength 650 nm.

EXAMPLE 10

Figure 12:
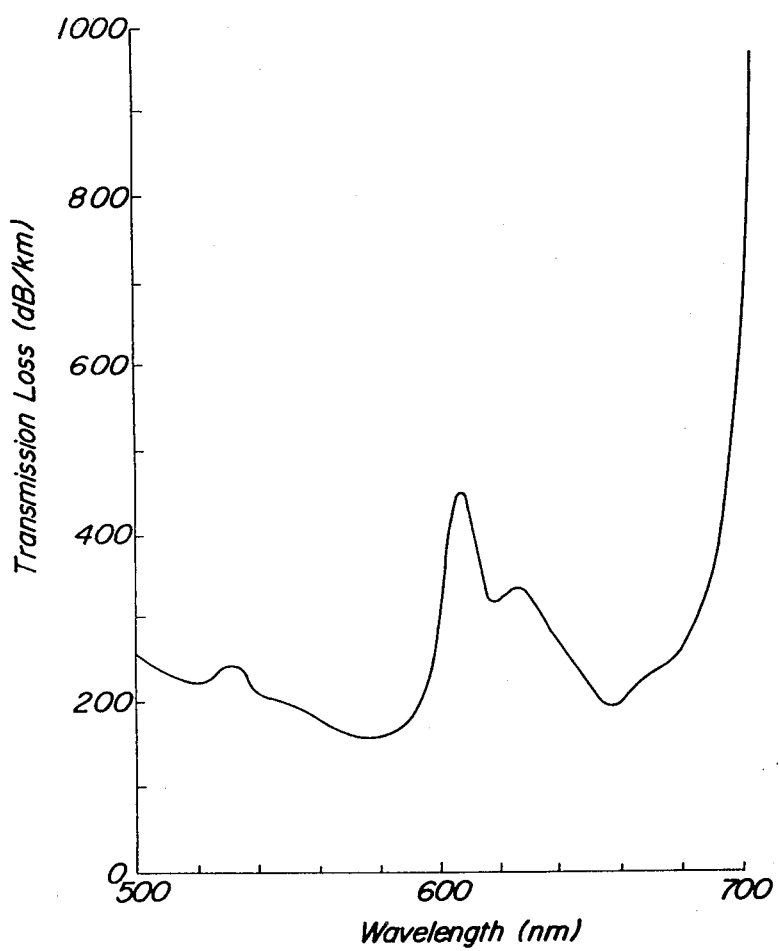
FIG. 12 is a graphical representation illustrating measured results of optical transmission characteristics in visible light region of the low-loss plastic optical fiber comprising the copolymer of the methyl methacrylate and styrene prepared in accordance with Example 10 of the invention as the core component.

In Example 8, a comonomer having ratio of azeotropic composition of methyl methacrylate and styrene (52 mol% of methyl methacrylate and 48 mol% of styrene) was utilized as the core component. Further, 5 m mol/l of azo—tert-butane as the polymerization initiator and 30 m mol/l of n-butyl mercaptan as the chain transfer agent were employed. When the detection of the dust in the comonomer was effected by the use of He-Ne laser, it was 2–0.02 or less per 10 cm optical path. The comonomer was subjected to bulk polymerization at 120° C. for 24 hours, then the temperature of the mixture was gradually raised up to 180° C. and the polymerization was completed at this temperature, thereby to obtain a core component copolymer. A part of the copolymer was taken out and the transition metallic ion contents thereof were measured, and as a result it was clear that 30 ppb iron, 5 ppb or less nickel, and 2 ppb or less cobalt were contained in the copolymer. This copolymer was subjected to melt spinning at 180° C. to obtain a fiber having 0.85 mm diameter. On the other hand, etylene-vinyl acetate copolymer was adopted as the cladding component. The core fiber thus prepared was introduced into the cladding component in molten state through an orifice to continuously coat the core fiber with the cladding component, whereby a composite fiber having a core-cladding structure in which the film thickness of the cladding component being 0.10 mm was fabricated. Optical transmission characteristics of the optical fiber thus obtained are illustrated by the graphical representation in FIG. 12. As is clear from FIG. 12, low loss windows existed at wavelengths 520 nm, 580 nm and 655 nm, respectively, and the attenuation amounts of them come to be 220 dB/km 155 dB/km and 200 dB/km, respectively, so that it was understood that a plastic optical fiber having very low loss optical transmission characteristics could be obtained.

As described above, according to the present invention, it is possible to obtain a core fiber containing very little micro voids, dust or impurities by such manner that throughout the steps from charging of the monomer to mixing the same with the polymerization initiator and chain transfer agent and the polymerization of such monomer are carried out in a completely sealed system under a reduced pressure condition, and the resulting core polymer is succeedingly subjected to melt spinning while maintaining the sealed condition. Besides when a mixture consisting of fluorine macromolecular copolymers or polymers having a lower refractive index than as well as a superior transparency and adhesion to those of the core fiber is utilized as the cladding component in order to fabricate an optical fiber, a remarkably low-loss plastic optical fiber having very excellent optical transmission characteristics in a visible light region in comparison with those of a conventional plastic optical fiber can be obtained. Such plastic optical fiber can be utilized for a short distance optical fiber of about 300 m with such advantages that the plastic optical fiber has a larger diameter, lighter weight, superior flexibility, ease of connection and handling than that of an inorganic glass optical fiber. In addition, there is also such an advantage that an economically preferable optical transmission system can be constructed, because an inexpensive yellowish green or red display high luminance light emitting diode (LED) can be adopted as light source by the use of a plastic optical fiber according to the invention.

Furthermore, a core component polymer obtained as an intermediate product in the method for fabricating a plastic optical fiber according to the present invention can be utilized as a material for optical waveguide path and the like other than the use for optical fibers, and such material can be employed by working such as casting or pressing, etc., so that a very low-loss optical circuit or optical path can also be fabricated.

What is claimed is:

1. In a fabrication method of low-loss plastic optical fibers by using a polymer prepared from methyl methacrylate as the principal constituent for a core material, and forming a cladding of a synthetic macromolecular compound having a lower refractive index than that of said core material therearound, the improvement comprises, in a sealed system, the steps of
adding a polymerization initiator and chain transfer agent via a distillation step of said polymerization initiator and chain transfer to a methyl methacrylate monomer distilled under a reduced pressure condition,
subjecting succeedingly said monomer to polymerization to produce a core polymer while maintaining said reduced pressure condition, and then
subjecting said core polymer produced to melt spinning to form a core fiber.

2. A fabrication method of low-loss plastic optical fibers as claimed in claim 1, wherein a cladding material of a fluorine macromolecular copolymer or a mixture of fluorine macromolecular polymers is adhered around said core fiber.

3. A fabrication method of low-loss plastic optical fibers as claimed in claim 1, wherein a component of said cladding is a copolymer consisting of one type of fluoroalkyl methacrylate as first ingredient and another type of fluoroalkyl methacrylate as second ingredient, and a molecular weight of said copolymer is within a range of 20,000–100,000 in weight-average molecular weight.

4. A fabrication method of low-loss plastic optical fibers as claimed in claim 3, wherein said cladding component is a copolymer which is prepared from two types of different fluoroalkyl methacrylates by subjecting said fluoroalkyl methacrylates to bulk polymerization in the absence of oxygen.

5. A fabrication method of low-loss plastic optical fibers as claimed in claim 3, wherein said cladding component is adhered around said core fiber by coating the cladding component in molten state.

6. A fabrication method of low-loss plastic optical fibers as claimed in claim 2, wherein said cladding component is a polymer blend prepared by fusing and admixing a first ingredient of a fluoroalkyl methacrylate polymer of a mixture of two types of different fluoroalkyl methacrylate copolymers with a second ingredient of vinylidene fluoride-tetrafluoroethylene copolymer.

7. A fabrication method of low-loss plastic optical fibers as claimed in claim 6, wherein said polymer blend comprises 10 to 50% by weight of said first fluoroalkyl methacrylate ingredient.

8. A fabrication method of low-loss plastic optical fibers as claimed in claim 1, wherein said polymerization initiator is a radical polymerization initiator exhibiting a favorable activity at a temperature higher than the glass transition temperature of said core polymer, and bulk polymerization is effected at a temperature higher than said glass transition temperature in case of polymerizing said methyl methacrylate monomer.

9. A fabrication method of low-loss plastic optical fibers as claimed in claim 1, wherein said core polymer after the completion of polymerization thereof is supplied to a melt spinning apparatus without lowering the temperature of said core polymer lower than the glass transition temperature thereof in case of melt spinning of said core polymer.

10. A fabrication method of low-loss plastic optical fibers as claimed in claim 8, wherein said polymerization initiator is an alkyl azo compound.

11. A fabrication method of low-loss plastic optical fibers as claimed in claim 10, wherein said polymerization initiator is azo-tert-butane.

12. A fabrication method of low-loss plastic optical fibers as claimed in claim 1, wherein a component of said cladding is applied to said core fiber by coating said cladding component in molten state in case of forming said cladding around said core fiber.

13. In a fabrication method of low-loss optical fibers consisting of a core and cladding each made of a synthetic macromolecular compound, the improvement comprises, in a sealed system, the steps of
supplying a core-forming monomer, polymerization initiator, and molecular weight modifier to a polymerization vessel via an atmospheric distillation or reduced pressure distillation step of all these ingredients under a reduced pressure condition, and
subjecting said distilled monomer to bulk polymerization in said polymerization vessel while maintaining said reduced pressure condition, thereby preparing a polymer for said core.

14. A fabrication method of low-loss plastic optical fibers as claimed in claim 13, wherein said core-forming monomer, polymerization initiator, and molecular weight modifier are separately distilled, and then the so distilled ingredients are introduced into said polymerization vessel.

15. A fabrication method of low-loss plastic optical fibers as claimed in claim 13, wherein at least two ingredients of said core-forming monomer, polymerization initiator, and molecular weight modifier are distilled in an admixed condition of said at least two ingredients, and then the so distilled ingredients are introduced into said polymerization vessel.

16. A fabrication method of low-loss plastic optical fibers as claimed in claim 13, wherein said core-forming monomer consists of a core-forming main monomer and core-forming sub-monomer.

17. In a fabrication method of low-loss plastic optical fibers by using a polymer prepared from methyl methacrylate as principal constituent for core material, and forming a cladding of a synthetic macromolecular compound having a lower refractive index than that of said core material therearound, the improvement comprises, in a sealed system, the steps of:

adding a polymerization initiator and a chain transfer agent to a methyl methacrylate monomer under a reduced pressure condition in such a manner that the number of dust in said methyl methacrylate monomer to which said polymerization initiator and chain transfer agent have been added is substantially 1 or less per 1 mm$^3$ at any place in said monomer, subjecting said methyl methacrylate monomer to which said polymerization initiator and said chain transfer agent have been added to bulk polymerization at a temperature higher than the glass transition temperature of said methyl methacrylate polymer, thereby preparing said polymer while further maintaining said reduced pressure condition in such a manner that each content of transition metallic ions in said polymer is 50 ppb or less for iron and manganese, 10 ppb or less for copper and nickel, 5 ppb or less for chromium, or 2 ppb or less for cobalt, subjecting said polymer to melt spinning at such a temperature that voids are not generated to form a core fiber, and applying said cladding of the substantially amorphous synthetic macromolecular compound having a lower refractive index than that of said core fiber around said core fiber.

18. A fabrication method of low-loss plastic optical fibers as claimed in claim 17, wherein said polymerization initiator and said chain transfer agent are selected from the group consisting of polymerization initiators or chain transfer agents which can easily be distilled under atmospheric or reduced pressure, and the selected polymerization initiator and transfer agent are added to said methyl methacrylate monomer via the distillation step of both the ingredients under a reduced pressure condition in said sealed system.

19. A fabrication method of low-loss plastic optical fibers as claimed in claim 17, wherein said polymerization initiator and said chain transfer agent are selected from the group consisting of polymerization initiators or chain transfer agents which can easily be distilled under atmospheric or reduced pressure, the selected polymerization initiator and transfer agent as well as said methyl methacrylate monomer are distilled under a reduced pressure condition in said sealed system, and only the fractions of said polymerization initiator and chain transfer agent are added to the so distilled methyl methacrylate monomer.

20. A fabrication method of low-loss plastic optical fibers as claimed in claim 17, wherein said polymerization initiator is a radical polymerization initiator exhibiting a favorable activity at a temperature higher than the glass transition temperature of said polymer.

21. A fabrication method of low-loss plastic optical fibers as claimed in claim 17, wherein said methyl methacrylate to which said polymerization initiator and said chain transfer agent have been added is subjected to bulk polymerization at a temperature higher than said glass transition temperature, and the resulting polymer is subjected to melt spinning without dropping the temperature of said polymer to the one lower than said glass transition temperature, thereby forming said core fiber.

22. A fabrication method of low-loss plastic optical fibers as claimed in claim 17, wherein said core material comprises 50 mol% or more of methyl methacrylate monomer unit and another monomer the boiling point of which is within a range of 80°–160° C. under atmospheric pressure.

* * * * *

UNITED STATES PATENT AND TRADEMARK OFFICE
CERTIFICATE OF CORRECTION

PATENT NO. : 4,381,269
DATED : April 26, 1983
INVENTOR(S) : T. KAINO et al

It is certified that error appears in the above-identified patent and that said Letters Patent are hereby corrected as shown below:

IN THE TITLE:

PLEASE CORRECT THE TITLE OF THIS PATENT TO READ -- FABRICATION METHOD OF A LOW-LOSS PLASTIC OPTICAL FIBER --.

Signed and Sealed this

Twenty-third Day of August 1983

[SEAL]

Attest:

GERALD J. MOSSINGHOFF

Attesting Officer    Commissioner of Patents and Trademarks